US011863968B2

(12) United States Patent
Chen et al.

(10) Patent No.: US 11,863,968 B2
(45) Date of Patent: Jan. 2, 2024

(54) STATIC USER EQUIPMENT GEOLOCATION

(71) Applicant: AT&T Intellectual Property I, L.P., Atlanta, GA (US)

(72) Inventors: Jie Chen, Millburn, NJ (US); Wenjie Zhao, Princeton, NJ (US); Abraham George, Litchfield, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 201 days.

(21) Appl. No.: 17/474,962

(22) Filed: Sep. 14, 2021

(65) Prior Publication Data

US 2023/0080065 A1 Mar. 16, 2023

(51) Int. Cl.
*H04W 4/021* (2018.01)
*H04W 4/029* (2018.01)
*H04W 8/02* (2009.01)
*H04W 24/08* (2009.01)
*H04W 64/00* (2009.01)
*H04W 4/02* (2018.01)

(52) U.S. Cl.
CPC ........... *H04W 4/021* (2013.01); *H04W 4/023* (2013.01); *H04W 4/029* (2018.02); *H04W 8/02* (2013.01); *H04W 24/08* (2013.01); *H04W 64/003* (2013.01)

(58) Field of Classification Search
CPC ....... H04W 64/00; H04W 4/025; H04W 4/29; H04W 24/08
USPC ........................................... 455/456.1, 456.3
See application file for complete search history.

(56) References Cited

U.S. PATENT DOCUMENTS 6,295,455 B1 * 9/2001 Fischer ................. H04W 64/00
342/450
9,131,462 B1 9/2015 Verghese et al.
9,277,431 B1 3/2016 Podolsky
11,032,665 B1 6/2021 George et al.
(Continued)

FOREIGN PATENT DOCUMENTS

WO WO-2004036935 A1 * 4/2004 ............. G01S 5/021

OTHER PUBLICATIONS

Y. Liu et al., "Enhancing Input Parameter Estimation by Machine Learning for the Simulation of Large-Scale Logistics Networks," 2020 Winter Simulation Conference (WSC), Orlando, FL, USA, 2020, pp. 608-619, doi: 10.1109/WSC48552.2020.9383942. (Year: 2020).*

(Continued)

*Primary Examiner* — William D Cumming
(74) *Attorney, Agent, or Firm* — Amin, Turocy & Watson, LLP

(57) ABSTRACT

The described technology is generally directed towards user equipment geolocation. Network measurement data associated with user equipment can be separated into static periods in which the user equipment was not moving, and moving periods in which the user equipment was moving. Static location processing can be applied to determine static locations from the static period network measurements, and moving location processing can be applied to determine moving locations from the moving period network measurements. Resulting static location information and moving location information can then be merged in order to improve the accuracy of both the static and the moving location information. The enhanced accuracy location information can be stored and used for any desired application.

20 Claims, 19 Drawing Sheets

(56) References Cited

U.S. PATENT DOCUMENTS

| | | | |
|---|---|---|---|
| 2002/0122406 A1 | 9/2002 | Chillariga et al. | |
| 2006/0116130 A1* | 6/2006 | Kennedy Jr. | H04B 17/318 |
| | | | 455/456.1 |
| 2009/0209271 A1 | 8/2009 | Reed et al. | |
| 2010/0159957 A1 | 6/2010 | Dando et al. | |
| 2013/0324154 A1* | 12/2013 | Raghupathy | H04W 4/025 |
| | | | 455/456.1 |
| 2015/0011235 A1 | 1/2015 | Agrawal et al. | |
| 2015/0045061 A1 | 2/2015 | Da | |
| 2016/0205184 A1 | 7/2016 | Norlin et al. | |
| 2018/0246222 A1 | 8/2018 | Song | |
| 2019/0319868 A1 | 10/2019 | Svennebring et al. | |
| 2020/0145790 A1 | 5/2020 | Yang et al. | |
| 2023/0080065 A1* | 3/2023 | Chen | H04W 24/08 |
| | | | 455/456.3 |
| 2023/0080704 A1* | 3/2023 | Chen | H04W 4/029 |
| | | | 455/456.1 |
| 2023/0083881 A1* | 3/2023 | Chen | G01S 5/0036 |
| | | | 455/456.1 |

OTHER PUBLICATIONS

Chen et al., "User Equipment Geolocation Using a History of Network Information," U.S. Appl. No. 17/409,246, filed Aug. 23, 2021, 52 pages.

Non-Final Office Action received for U.S. Appl. No. 17/474,962 dated Aug. 9, 2023, 34 pages.

Non-Final Office Action received for U.S. Appl. No. 17/409,246 dated Sep. 8, 2023, 94 pages.

Notice of Allowance received for U.S. Appl. No. 17/474,883 dated Aug. 17, 2023, 33 pages.

\* cited by examiner

STATIC USER EQUIPMENT GEOLOCATION

TECHNICAL FIELD

The subject application is related to user equipment geolocation by cellular communication systems, for example, geolocation of user equipment that communicate via fourth generation (4G), fifth generation (5G), and subsequent generation cellular networks.

BACKGROUND

User equipment (UE) geolocation is a key enabler for radio access network (RAN) optimization and network planning. Network service providers can identify coverage holes, hot spots and capacity issues by combining UE location information with wireless network measurements such as signal strength and UE throughput. This enables providers to better plan network capacity, resulting in improved network performance. High quality UE location estimation is important for network planning.

Most existing UE geolocation techniques are based on wireless network measurements collected from cells instantly or in a very short time window, e.g., over several minutes. It is challenging to estimate UE locations accurately with a limited quantity of network measurements, especially for stationary UEs. Due to the high variability of network measurements collected for UEs, location estimates usually contain errors. Moreover, UE route estimates generated by connecting such location estimates can be improbable or illogical.

In an example, geotagging techniques can estimate UE locations based on instantaneous network measurements or a short history of measurements. In these methods, the time span of historical measurements is typically very short due to limited computational resources. Results often have poor location estimation accuracy, especially when there is significant noise in the measurements. It is common for a UE to generate measurements in which the observed serving cells and corresponding timing advance (TA), reference signal received power (RSRP) and reference signal received quality (RSRQ) values vary significantly. Because the measurements vary, the resulting location estimates also vary.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
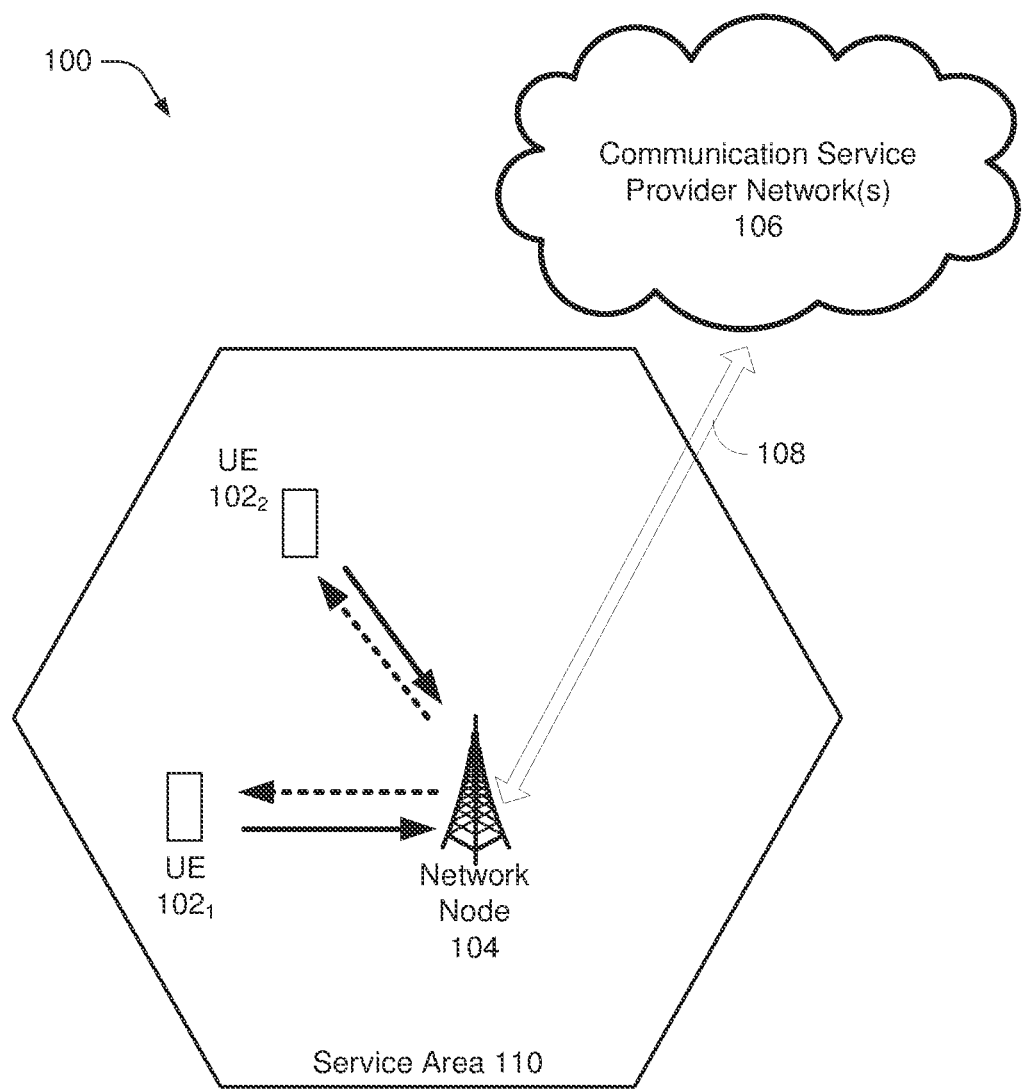
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards user equipment geolocation, i.e., identifying physical locations at which user equipment is or was located. Network measurement data associated with user equipment can be separated into static periods in which the user equipment was not moving, and moving periods in which the user equipment was moving. Static location processing can be applied to determine static locations from the static period network measurements, and moving location processing can be applied to determine moving locations from the moving period network measurements. Resulting static location information and moving location information can then be merged in order to improve the accuracy of both the static and the moving location information. The enhanced accuracy location information can be stored and used for any desired application. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other 4G systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
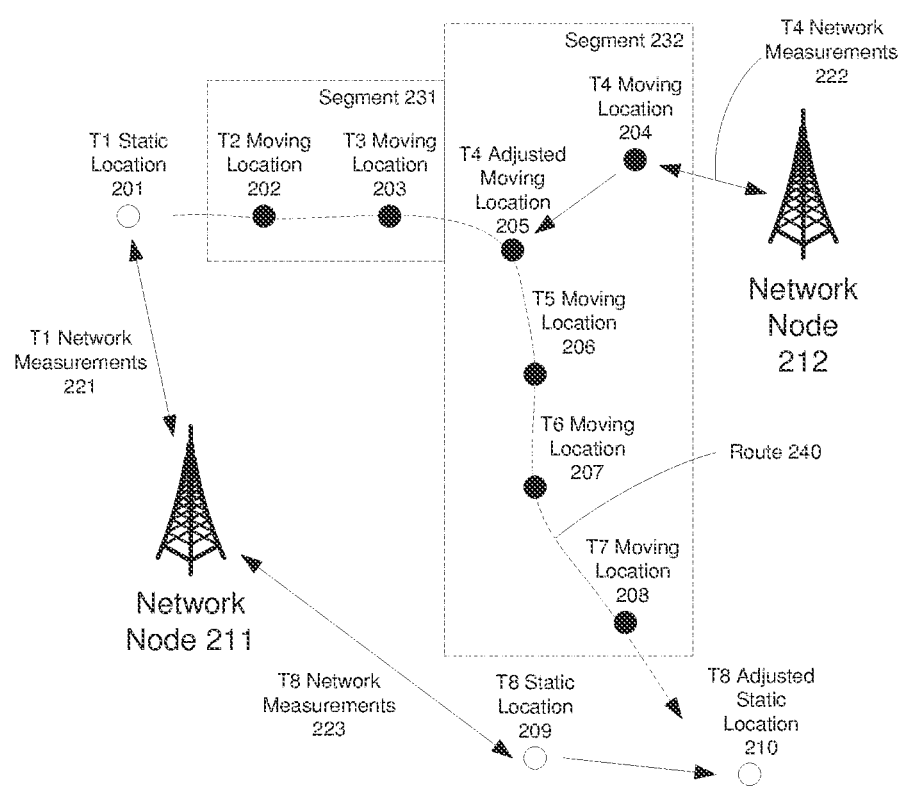
FIG. 2 illustrates example static and moving locations of user equipment, and example network measurements reported to network nodes of a wireless communication system, in accordance with various aspects and embodiments of the subject disclosure.

FIG. 2 illustrates example static and moving locations of user equipment, and example network measurements reported to network nodes of a wireless communication system, in accordance with various aspects and embodiments of the subject disclosure. FIG. 2 includes example network nodes 211 and 212 and various example locations within a geographical region surrounding the network nodes 211 and 212.

The locations represent estimated locations visited by user equipment at different times T1, T2, T3, T4, T5, T6, T7, T8 (the user equipment itself is not illustrated in FIG. 2 for simplicity of illustration). The estimated locations include "static" locations, at which the user equipment remained for a "long" period of time, e.g., for 15 minutes or longer, and "moving" locations, visited by the user equipment as the user equipment was in motion, e.g., along the illustrated route 240. The estimated locations comprise T1 static location 201, T2 moving location 202, T3 moving location 203, T4 moving location 204, T4 adjusted moving location 205, T5 moving location 206, T6 moving location 207, T7 moving location 208, T8 static location 209, and T8 adjusted static location 210.

In FIG. 2, the estimated T4 moving location 204 of the user equipment at time T4 can be adjusted according to techniques disclosed herein, thereby identifying T4 adjusted moving location 205. Similarly, the estimated T8 static location 209 of the user equipment at time T8 can be adjusted according to techniques disclosed herein, thereby identifying T8 adjusted static location 210. The T4 adjusted moving location 205 and the T8 adjusted static location 210 can have higher accuracy than the initially estimated locations 204, 209. The adjusted locations 205, 210 can be stored along with other estimated location information 201, 202, 203, 206, 207, and 208, to achieve improved location information associated with the user equipment. The resulting higher accuracy location information can be used for any desired application, e.g., for network planning or any other application.

In general, the techniques disclosed herein can include obtaining a time series of network measurement data associated with the user equipment. The time series of network measurement data can include network measurement data collected at multiple different times, e.g., collected at each of the illustrated times T1, T2, T3, T4, T5, T6, T7, T8. FIG. 2 illustrates collection of example T1 network measurements 221 via network node 211, collection of example T4 network measurements 222 via network node 212, and collection of example T8 network measurements 223 via network node 211. The network nodes 211 and 212, or any other network nodes serving the user equipment, can similarly collect network measurements at the other times T2, T3, T5, T6, and T7. Network measurement data such as T1 network measurements 221, T4 network measurements 222, and T8 network measurements 223 can be provided to network equipment, e.g. network equipment included in the communication service provider network(s) 106 illustrated in FIG. 1, and the network equipment can process the network measurement data according to the techniques disclosed herein. Example network equipment and operations thereof are described further in connection with FIGS. 3-18.

As will be described in further detail with reference to FIGS. 3-18, processing of network measurement data according to this disclosure can generally include sorting the network measurement data into data associated with static locations, such as T1 static location 201 and T8 static location 209, and data associated with moving locations, such as moving locations 202-208. Separate processing techniques can then be applied to the static location data and the moving location data, followed by merge operations wherein static location information is used to improve moving location information, and vice versa.

Furthermore, processing techniques applied to moving location data associated with moving locations 202-208 can include, inter alia, separating the moving location data into data associated with different segments 231 and 232. The different segments 231 and 232 can be associated with different user equipment travel speeds. The moving location data associated with each segment 231 and 232 can be processed independently, followed by merge operations wherein location information associated with the segments 231 and 232 can be joined with location information from other segments as well as static location information.

Figure 3:
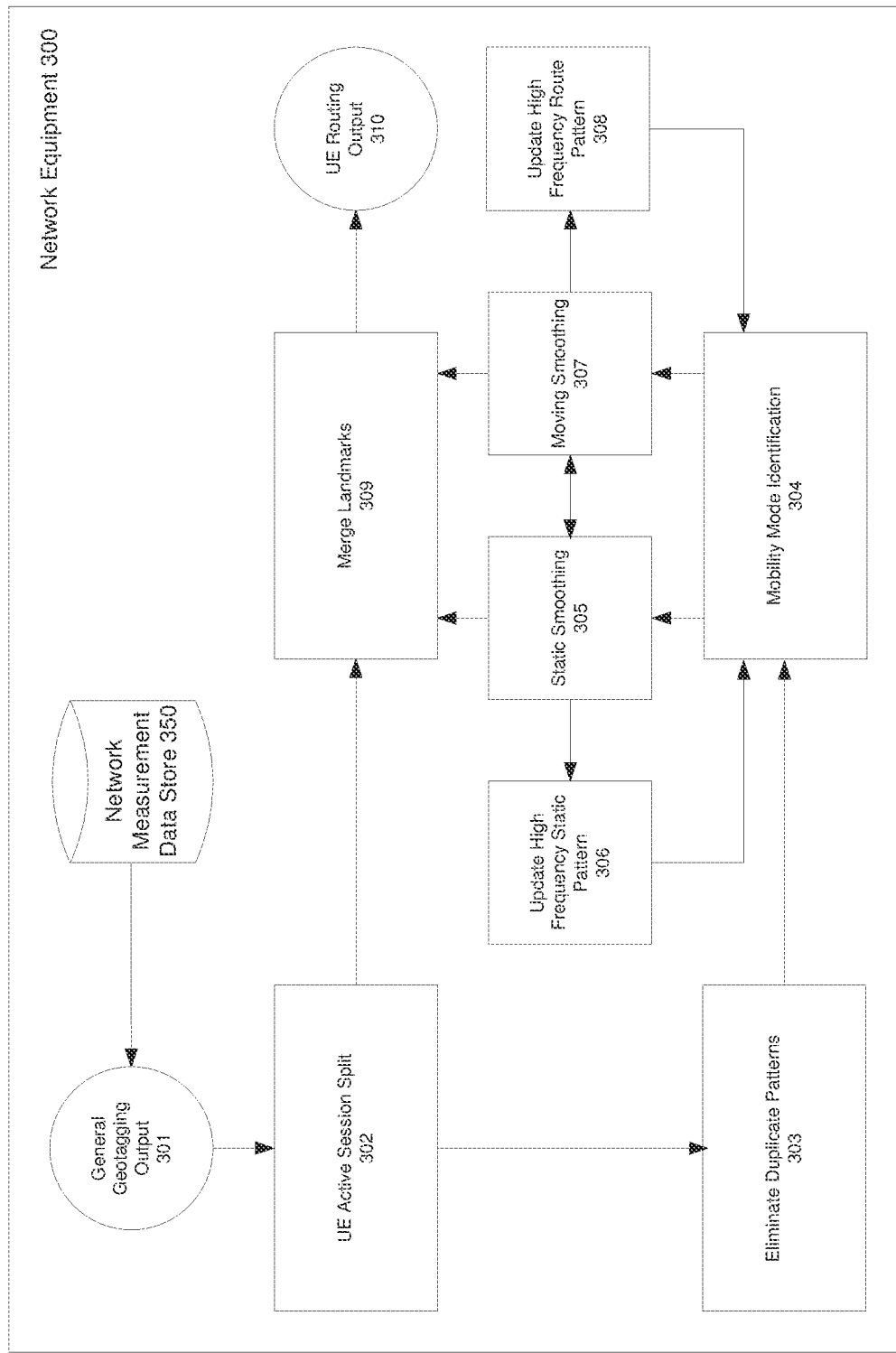
FIG. 3 illustrates example network equipment configured to perform mobility mode identification of static and moving user equipment mobility modes, in accordance with various aspects and embodiments of the subject disclosure.

FIG. 3 illustrates example network equipment configured to perform mobility mode identification of static and moving user equipment mobility modes, in accordance with various aspects and embodiments of the subject disclosure. FIG. 3 includes example network equipment 300, wherein the example network equipment 300 can be included in communication service provider network(s) 106 illustrated in FIG. 1, and wherein the example network equipment 300 can furthermore obtain network measurement data such as described with reference to FIG. 2.

The network equipment 300 includes network measurement data store 350, general geotagging output 301, UE active session split 302, eliminate duplicate patterns 303, mobility mode identification 304, static smoothing 305, update high frequency static pattern 306, moving smoothing 307, update high frequency route pattern 308, merge landmarks 309, and UE routing output 310.

In general, with reference to FIG. 3, the network equipment 300 can be configured to use UE active session split 302, eliminate duplicate patterns 303, and mobility mode identification 304 to identify network measurement data associated with static UE locations, and to identify network measurement data associated with moving UE locations. The network equipment 300 can then use static smoothing 305 and update high frequency static pattern 306 to process network measurement data associated with the static UE locations, and the network equipment 300 can use moving smoothing 307 and update high frequency route pattern 308 to process network measurement data associated with the moving UE locations. The network equipment 300 can then use merge landmarks 309 to further improve UE location information, and the network equipment 300 can produce the UE routing output 310 comprising adjusted/improved UE location information.

In an aspect, FIG. 3 provides a framework to improve UE routing with the measurements reported by cells and eNodeBs in a telecommunications network. Methods can utilize both the network measurement patterns and time-sequences of UE locations estimated by general online geotagging processes. Methods can first determine the mobility status of a UE across various timestamps, i.e., whether the UE is static or moving. Methods can then split a UE route into multiple mobility periods, within each of which the UE mobility status is substantially unchanged. For each mobility period, methods can apply suitable static/moving processing to further improve the location estimates. Methods can employ this divide and conquer approach in part because measurement noise characteristics tend to be quite different across static and moving modes. Finally, methods can combine the estimates from the various mobility periods together for a complete route. Methods can provide the capability to identify UE mobility status and improve overall accuracy for 5G and future wireless network geolocation.

In another aspect, FIG. 3 provides a framework for UE offline routing which utilizes the time sequence of wireless network measurements and estimated UE locations via general geotagging processes. Embodiments can learn the time series of network measurement patterns and build databases to reinforce the learning to determine the mobility status of UEs effectively. Mobility mode identification 304 can split UE routes into moving periods and static periods. Network equipment 300 can then apply different (static/moving) smoothing functions 305, 307 to corresponding mobility periods. Embodiments can furthermore design the reference points to exchange between different mobility periods which helps form seamless routes when concatenating the location estimates from such periods.

Network equipment 300 can enable improved UE routing in a telecommunication network. Embodiments can smooth individual UE routes by using a combination of primary location estimates based on general geolocation technologies, and secondary location estimates based on learned time series measurement patterns to remove outliers. In some embodiments, a UE route can be represented using locations where there is a change in the UE network measurement pattern. This reduces the computational effort by eliminating redundant location estimation calculations. Embodiments can furthermore identify the UE mobility status (whether static or moving), based on the UE network measurement patterns across various time periods.

Network equipment 300 can utilize databases to store frequently observed network measurement patterns corresponding to static modes and routes for specific UEs. Network equipment 300 can apply appropriate smoothing algorithms adapted to the UE mobility status. For example, network equipment 300 can reuse the patterns stored in the database when the UE is inferred to be static. Network equipment 300 can combine the estimates from the various time periods (where the UE could be in multiple mobility modes) to recover the complete UE route.

Figure 4:
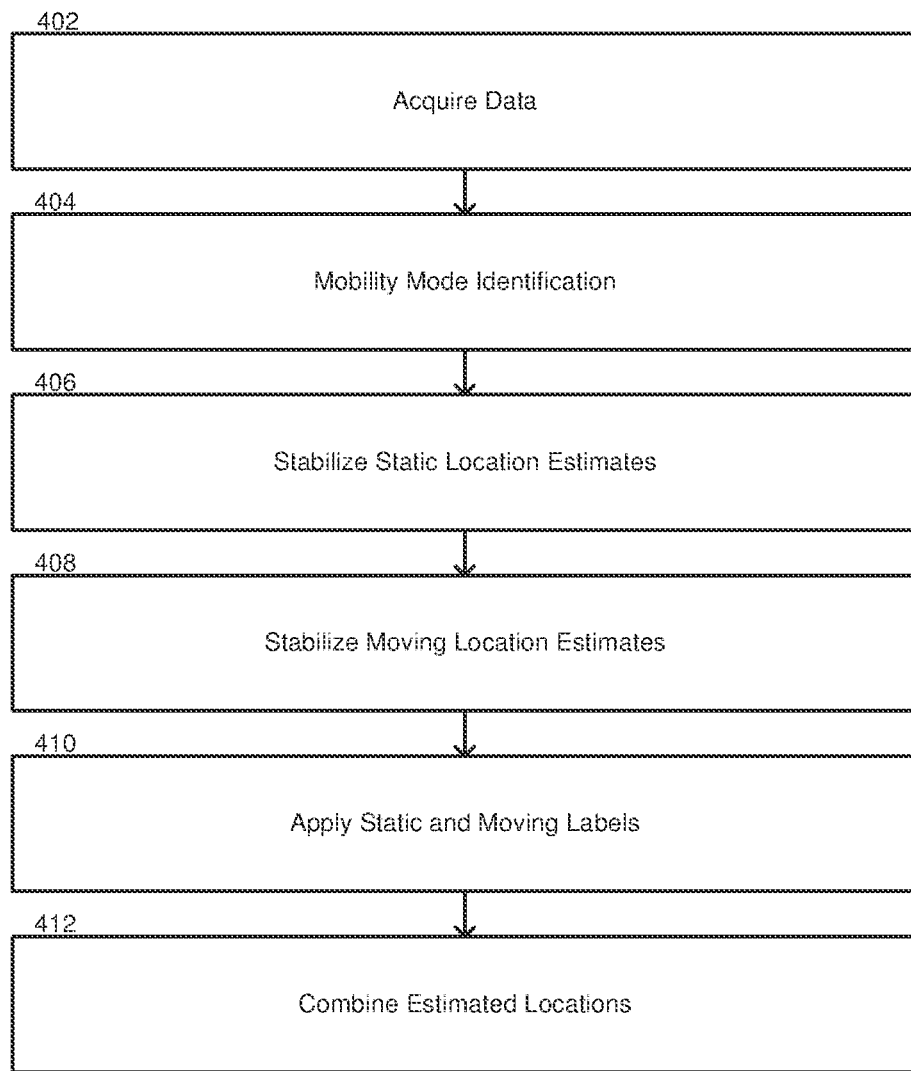
FIG. 4 is a flow diagram representing example operations of network equipment to perform mobility mode identification of static and moving user equipment mobility modes, in accordance with various aspects and embodiments of the subject disclosure.

FIG. 4 is a flow diagram representing example operations of network equipment to perform mobility mode identification of static and moving user equipment mobility modes, in accordance with various aspects and embodiments of the subject disclosure. The illustrated operations can be performed, e.g., by network equipment 300 such as illustrated in FIG. 3.

At acquire data 402, network equipment 300 can acquire time-sequences of historical geotagged call trace data. For example, network equipment 300 can obtain general geotagging output 301 from network measurement data store 350. The general geotagging output 301 can include, but need not be limited to, historical geotagged call trace data comprising at least one of international mobile subscriber identity (IMSI) information, timestamp information, timing advance information, signal strength information, serving cell information, estimated latitude information, estimated longitude information, or geotagging type information.

The UE active session split 302 can be configured to identify different periods of UE activity within general geotagging output 301, and eliminate duplicate patterns 303 can be configured to eliminate duplicates in order to decrease the volume of data to be processed.

At mobility mode identification 404, network equipment 300 can be configured to apply UE mobility mode identification 304 to the UE network measurements to mark each record as static or moving. UE mobility mode identification 304 can be configured to use this indicator to split each UE's measurements time series into static periods and moving periods.

At stabilize static location estimates 406, network equipment 300 can be configured to apply static smoothing 305 to stabilize the estimated locations in each static period. At stabilize moving location estimates 408, network equipment 300 can be configured to apply moving smoothing 307 to remove outliers and estimate a robust route for each of the moving periods. At apply static and moving labels 410, network equipment 300 can be configured to use update high frequency static pattern 306 and update high frequency route pattern 308, respectively, to apply labels such as "static pattern"/"moving pattern" labels to network measurement/estimated location pairs. Network equipment 300 can be configured to feed this data back to UE mobility mode identification 304 and static/moving smoothing 305, 307 to refine the patterns over time, enabling process speed up. At combine estimated locations 412, network equipment 300 can be configured to combine the estimated locations from the various periods to generate a complete time-series of location estimates for each UE.

Figure 5:
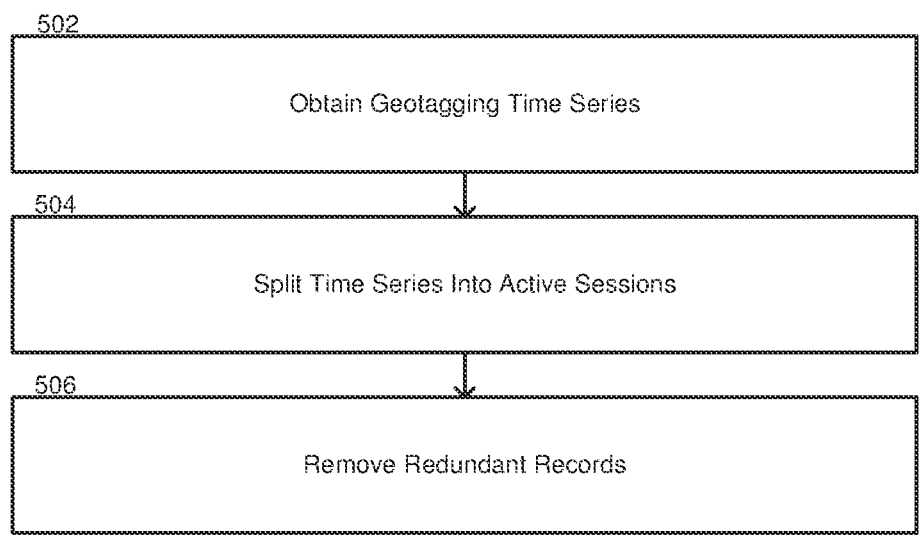
FIG. 5 is a flow diagram representing example operations of network equipment to prepare a time series of historical geotagged call trace data, in accordance with various aspects and embodiments of the subject disclosure.

FIG. 5 is a flow diagram representing example operations of network equipment to prepare a time series of historical geotagged call trace data, in accordance with various aspects and embodiments of the subject disclosure. The illustrated operations can be performed, e.g., by network equipment 300 such as illustrated in FIG. 3.

At obtain geotagging time series 502, network equipment 300 can be configured to obtain general geotagging output 301 comprising a time series of call trace records. The output 301 can contain the network measurements and estimated location information such as $U_r$=(IMSI, timestamp, network measurements, EST_LAT, EST_LON, alg_info), where alg_info indicates the geotagging technology used and the associated accuracy, EST_LAT is an estimated latitude, and EST_LON is an estimated longitude. Further network measurements can include, e.g., global connectivity index (GCI), timing advance (TA), reference signal received power (RSRP), reference signal received power (RSRQ), or other measurement information.

At split time series into active sessions 504, for a given UE, network equipment 300 can apply UE active session split 302 to split the time series into active sessions based on the record timestamps. This can include sorting the records in a given time series by timestamp; including records within a specified time interval, $\delta_t$ (for example, $\delta_t$=10 minutes), of the previous timestamp, into a same active session; and otherwise, generating a new active session starting with a given record.

At remove redundant records 506, within a given active session, network equipment 300 can be configured to run eliminate duplicate patterns 303 to remove redundant UE records. This can include, e.g., ignoring the timestamp, and comparing each record information with a previous record. If the record information is duplicated, then remove the current record. This method keeps new information in a time series, thus reducing the computational burden. In real-world networks, network measurements can repeat many times over and the corresponding location estimates can be identical as well. The number of records can be reduced significantly, without sacrificing the accuracy of later steps.

Figure 6:
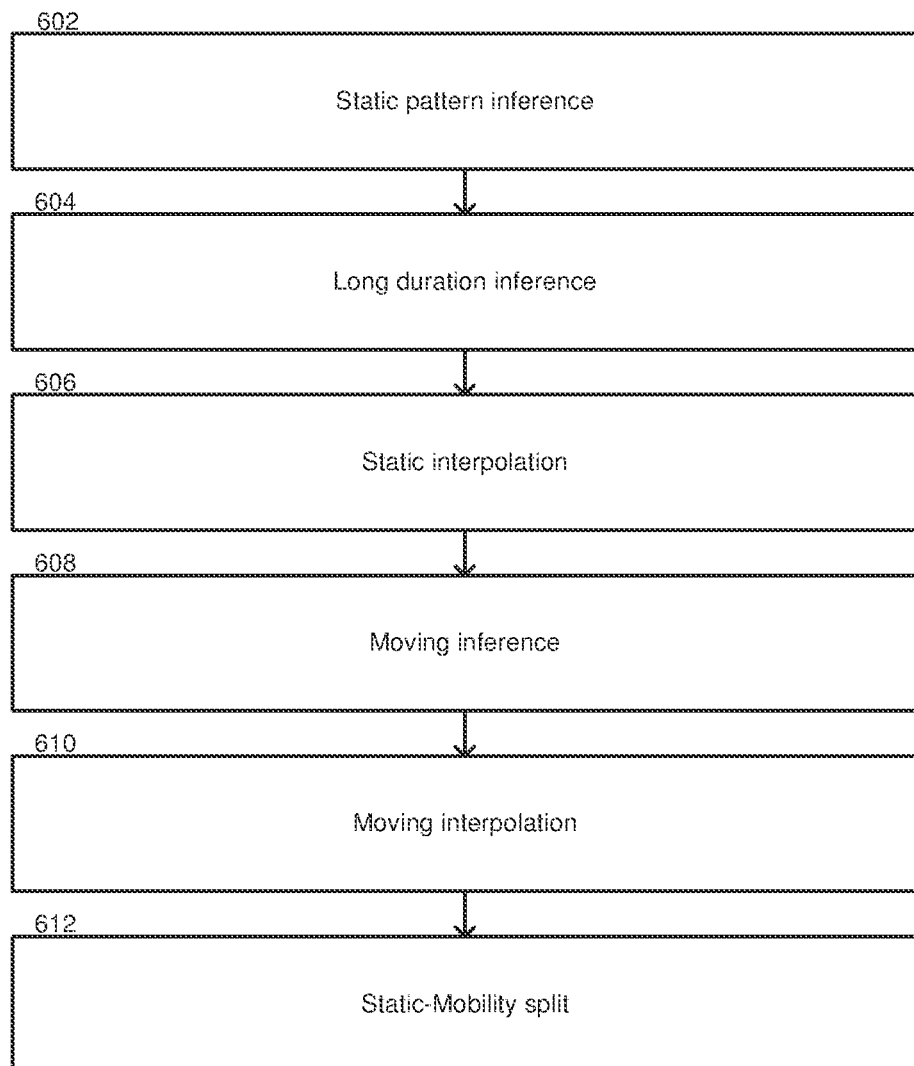
FIG. 6 is a flow diagram representing example operations of network equipment to apply mobility mode identification, in accordance with various aspects and embodiments of the subject disclosure.

FIG. 6 is a flow diagram representing example operations of network equipment to apply mobility mode identification, in accordance with various aspects and embodiments of the subject disclosure. The illustrated operations can be performed, e.g., by network equipment 300 such as illustrated in FIG. 3.

At static pattern inference 602, for each record, mobility mode identification 304 can compare the network measurements (such as serving cell and timing advance) with a UE's known static patterns. The known static pattern can be based on a long time history (e.g., months) of UE call trace records. The locations frequently visited by a UE (also referred to herein as frequently visited places or FVPs) can be identified and estimated with corresponding serving cell and TA values. Since the UE is static at those FVP locations, the associated measurements (IMSI, serving cell, TA) patterns, if encountered in the future, can be used to infer that the UE is static. FVP patterns comprise an initial set of UE static patterns. If matched, mobility mode identification 304 can mark the record with a 'static' tag. Otherwise, mobility mode identification 304 can proceed to the next step.

At long duration inference 604, mobility mode identification 304 can apply long duration inferences. For example, mobility mode identification 304 can check the duration (the difference between a timestamp of a next change and a current timestamp) of a network measurement. If the duration is larger than a predetermined value, e.g., a "static_cutoff" value such as 10 minutes, the record can be marked with a 'static' tag. Otherwise mobility mode identification 304 can proceed to the next step.

At static interpolation 606, mobility mode identification 304 can perform static interpolation. If the duration is short, mobility mode identification 304 can calculate a static gap as a difference between a timestamp of a next tagged static record and a timestamp of a previous tagged static record. If static gap is smaller than a predetermined value, e.g., a "static_cutoff2" such as 5 minutes, the record can be marked with a 'static' tag since the UE is static right before and after.

At moving inference 608, mobility mode identification 304 can perform moving inference. Mobility mode identification 304 can mark records without a 'static' tag as 'moving'. At moving interpolation 610, mobility mode identification 304 can then perform moving interpolation, wherein mobility mode identification 304 can re-evaluate records tagged as 'static'. For each such record, mobility mode identification 304 can calculate the moving gap as the difference between a timestamp of a next tagged moving record and a timestamp of a previous tagged static record. If moving gap is smaller than a predetermined value, e.g., a "moving cutoff" value such as 5 minutes, mobility mode identification 304 can revise the tag of this record as 'moving' since the UE is moving right before and after.

At static-mobility split 612, mobility mode identification 304 can perform a static-mobility split in which mobility mode identification 304 splits an active session time series into static and moving periods based on the tag of each record, by adding consecutive records tagged similarly to the same period if the time gap is small, such as 10 minutes or less.

Figure 7:
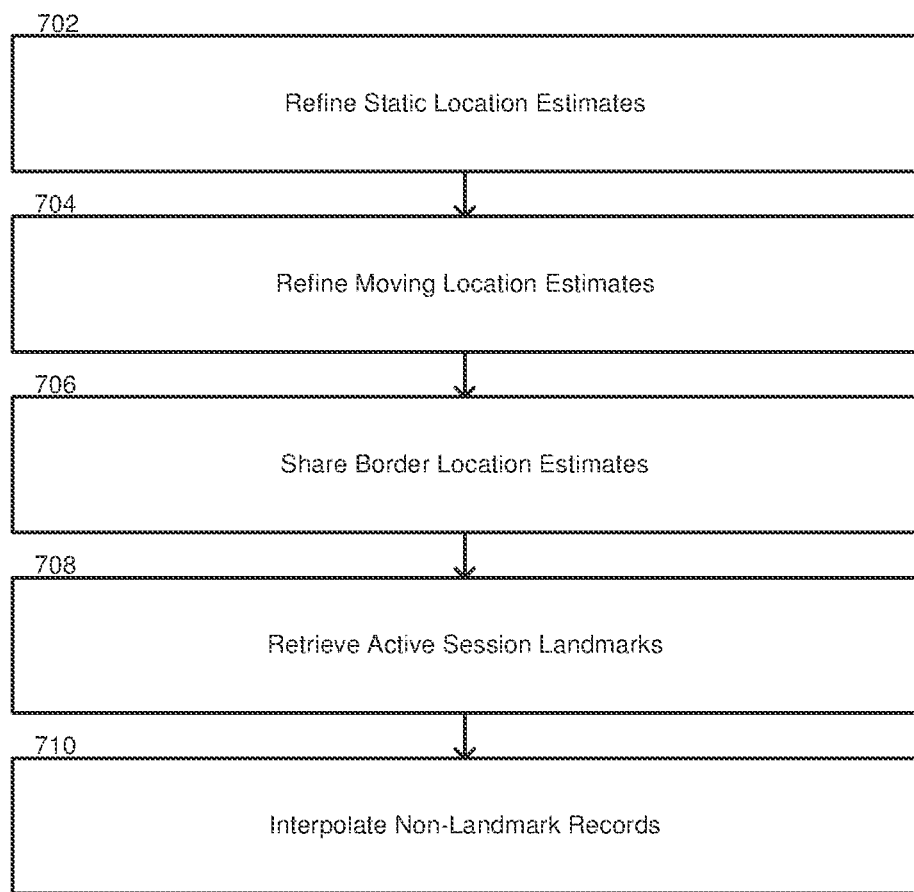
FIG. 7 is a flow diagram representing example operations of network equipment to estimate UE routes, in accordance with various aspects and embodiments of the subject disclosure.

FIG. 7 is a flow diagram representing example operations of network equipment to estimate UE routes, in accordance with various aspects and embodiments of the subject disclosure. The illustrated operations can be performed, e.g., by network equipment 300 such as illustrated in FIG. 3.

At refine static location estimates 702, for UE records in a static period, network equipment 300 can apply static smoothing 305 to refine the location estimates. The output can be represented, e.g., as (IMSI, timestamp, network measurements, EST_LAT static, EST_LON static). When a specific (IMSI, network measurements) pattern is observed with high frequency over a long history, the "update high frequency static pattern" component 306 can mark the pattern as a high frequency static pattern, and the pattern can be stored with location indicated as (EST_LAT static, EST_LON static). This location estimate can be applied when the pattern is observed in the static periods of future time series.

At refine moving location estimates 704, for UE records in a moving period, network equipment 300 can apply moving smoothing 307 to improve the locations estimated in the period, to form a practical route. The corresponding output can be represented as (IMSI, timestamp, network measurements, EST_LAT moving, EST_LON moving). If such a moving pattern (IMSI, network measurements) is observed repeatedly over the historical trace of the UE, then update high frequency route pattern 308 can store the pattern with locations (EST_LAT moving, EST_LON moving), in order to guide UE mobility mode identification 304 and moving smoothing 307 in future session time series.

At share border location estimates 706, records at the border of a "mobility mode" change can be shared between static smoothing 305 and moving smoothing 307. For example, for a moving period, the static records right before and/or after this period can be added to the moving period time series as reference points. Moving smoothing 307 need not change the location estimation of those static points but can use those locations to regulate the estimated points when UE is moving. Similarly, the moving locations right before and/or after a static period can also be included and referred by static smoothing 305.

At retrieve active session landmarks 708, merge landmarks 309 can be configured to combine estimated locations from static smoothing 305 and moving smoothing 307 to retrieve active session landmarks. Landmarks can be represented as (IMSI, timestamp, network measurements, EST_LAT*, EST_LON*), where EST_LAT*=EST_LAT static or EST_LAT moving and EST_LON*=EST_LON static or EST_LON moving. At interpolate non-landmark records 710, for records in an original active session time series but not in landmarks, merge landmarks 309 can interpolate the UE locations based on timestamps between landmarks.

Figure 8:
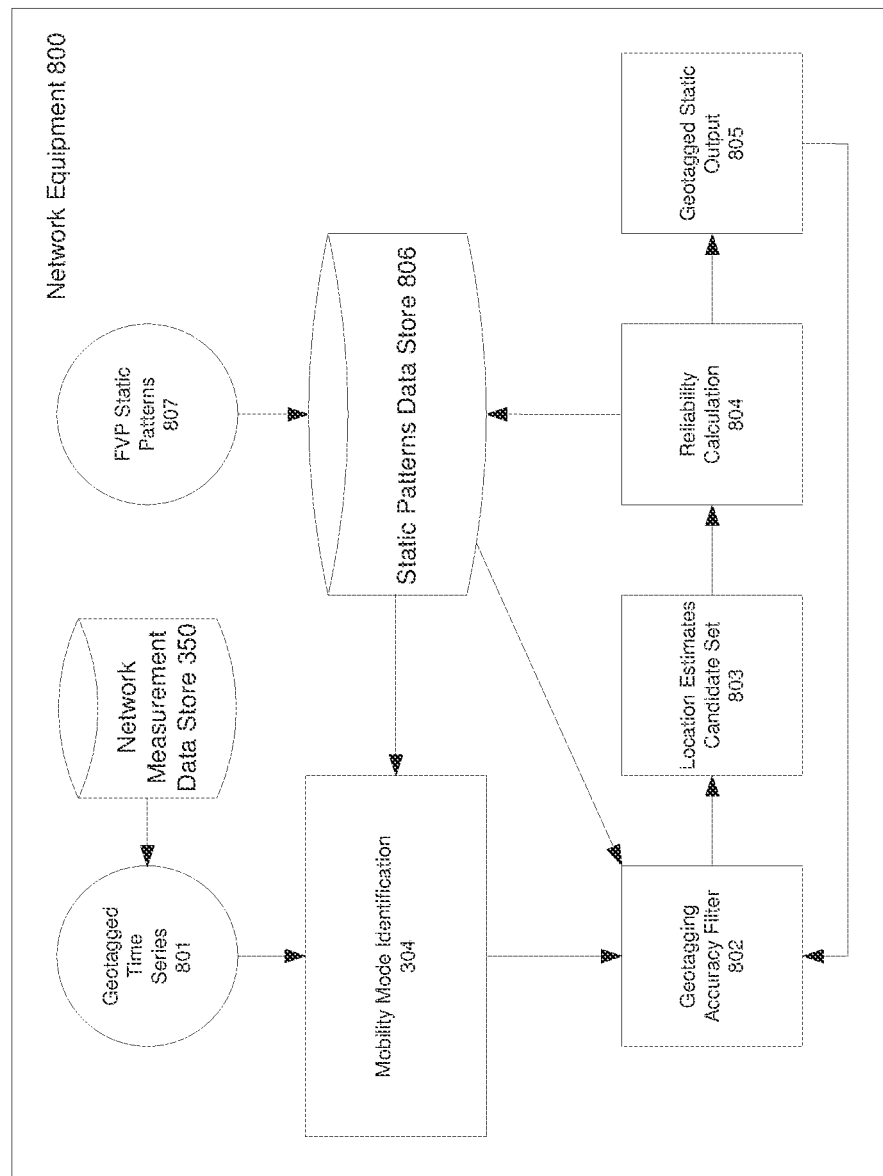
FIG. 8 illustrates example network equipment configured to estimate static user equipment locations based on network measurement data, in accordance with various aspects and embodiments of the subject disclosure.

FIG. 8 illustrates example network equipment configured to estimate static user equipment locations based on network measurement data, in accordance with various aspects and embodiments of the subject disclosure. FIG. 8 includes example network equipment 800, wherein the example network equipment 800 can optionally process network measurement data associated with static user equipment locations. As such, aspects of network equipment 800 can optionally be included in the network equipment 300 described with reference to FIG. 3, and vice versa. For example, in some embodiments, network equipment 800 can implement, inter alia, the static smoothing 305 illustrated in FIG. 3.

The network equipment 800 includes network measurement data store 350, geotagged time series 801, mobility mode identification 304, geotagging accuracy filter 802, location estimates candidate set 803, reliability calculation 804, geotagged static output 805, static patterns data store 806, and FVP static patterns 807.

In general, with reference to FIG. 8, the network equipment 800 can be configured to identify static UEs and estimate their location accurately using measurements reported by cells and eNodeB s in a telecommunications network. The network equipment 800 can utilize network measurement patterns learned over time to identify static UEs and select the most reliable location estimates. The network equipment 800 can therefore implement a framework to identify and geolocate static UEs in a telecommunication network. The network equipment 800 can utilize historical UE network measurement data to learn measurement patterns associated with static UEs, which can be stored in a static pattern database such as FVP static patterns 807. Given new UE network measurement data observed over shorter timespans, the network equipment 800 can use the learned static pattern information to determine whether the UE is static or not, and to estimate UE location during the static time periods. The network equipment 800 can estimate locations within a given static time period together, based on a derived reliability measure.

Figure 9:
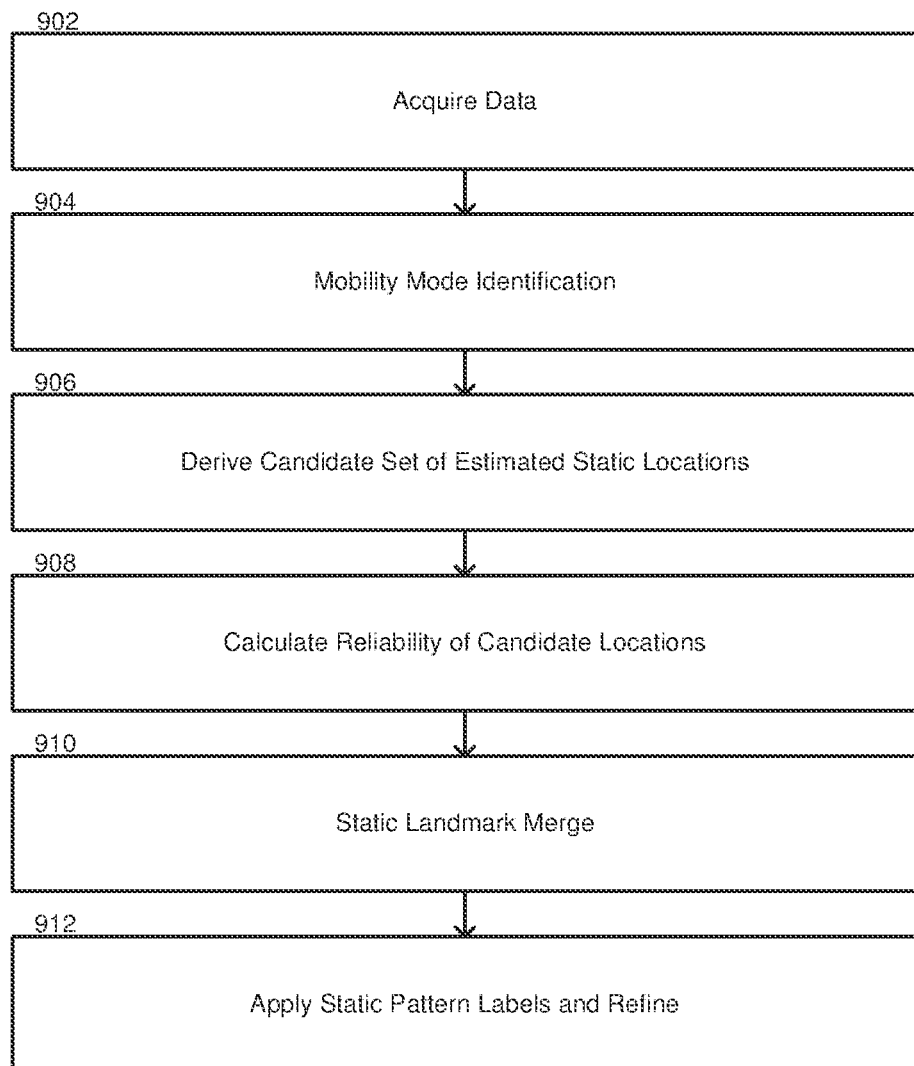
FIG. 9 is a flow diagram representing example operations of network equipment to estimate static user equipment locations based on network measurement data, in accordance with various aspects and embodiments of the subject disclosure.

FIG. 9 is a flow diagram representing example operations of network equipment to estimate static user equipment locations based on network measurement data, in accordance with various aspects and embodiments of the subject disclosure. The illustrated operations can be performed, e.g., by network equipment 800 such as illustrated in FIG. 8.

At acquire data 902, the network equipment 800 can be configured to acquire a time series of historical geotagged call trace data such as geotagged time series 801, which can be obtained for example from network measurement data store 350. The geotagged time series 801 can include, but need not be limited to, IMSI, timestamp, timing advance, signal strength, serving cell, estimated latitude, estimated longitude, and geotagging type information. The geotagging type information can include, e.g., identifications of geotagging methodologies used for geotagging, and associated accuracy information.

At mobility mode identification 904, the network equipment 800 can next apply mobility mode identification 304 to each record within geotagged time series 801, in order to determine whether a UE is static or in motion. Based on the determinations, mobility mode identification 304 can extract the periods where the UE is static.

At derive candidate set of estimated static locations 906, within each static period, the network equipment 800 can derive a candidate set of estimated locations based on geotagging accuracy. At calculate reliability of candidate locations 908, reliability of each candidate location can be calculated based on network measurements observed within that static time period. A subset of "most reliable" location estimates can be determined, optionally according to pre-specified rules. These reliable location estimates can be assigned to the call trace records in the static period.

At static landmark merge 910, network equipment 800 can next apply a static landmark merge algorithm to identify incorrectly tagged records, such as static records tagged as moving records due to measurements observed with large noise. The network equipment 800 can merge consecutive static periods to improve the estimation accuracy.

At apply static pattern labels and refine 912, the network equipment 800 can be configured to apply "static pattern" labels to network measurement/estimated location pairs corresponding to the "most reliable" location estimates. The network equipment 800 can feed this data back to the UE mobility mode identification 304 and, e.g. to the static smoothing 305 illustrated in FIG. 3, to refine the patterns over time, enabling the process to speed up over time.

The network equipment 800 can include mobility mode identification 304, introduced in FIG. 3. Example operations of mobility mode identification 304 are previously described with reference FIG. 6.

Figure 10:
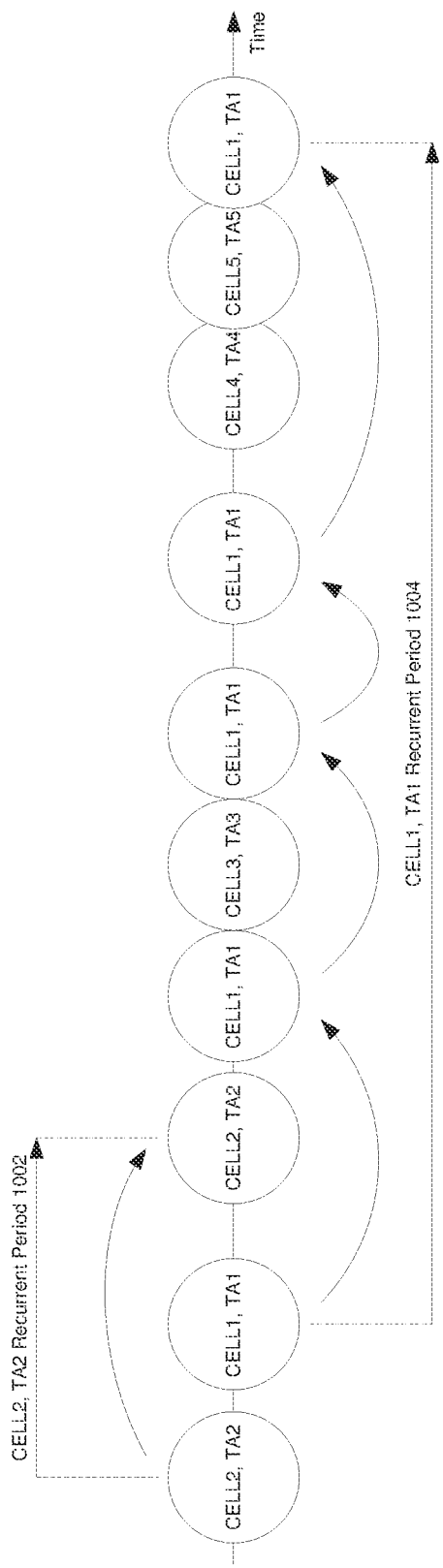
FIG. 10 illustrates example recurring network measurement data that can be used to identify static user equipment, in accordance with various aspects and embodiments of the subject disclosure.

FIG. 10 illustrates example recurring network measurement data that can be used to identify static user equipment, in accordance with various aspects and embodiments of the subject disclosure. FIG. 10 includes a time series of network measurement data associated with a UE. FIG. 10 includes a timeline comprising different cell and TA values associated with the UE. The cell and TA values include, e.g., CELL2, TA2, followed by CELL1, TA1, followed by CELL2, TA2, followed by CELL1, TA1, followed by CELL5, TA3, followed by CELL1, TA1, followed by CELL1, TA1, followed by CELL4, TA4, followed by CELL5, TA5, followed by CELL1, TA1. An example CELL2, TA2 recurrent period 1002 comprises recurring instances of CELL2, TA2. An example CELL1, TA1 recurrent period 1004 comprises recurring instances of CELL1, TA1.

Figure 11:
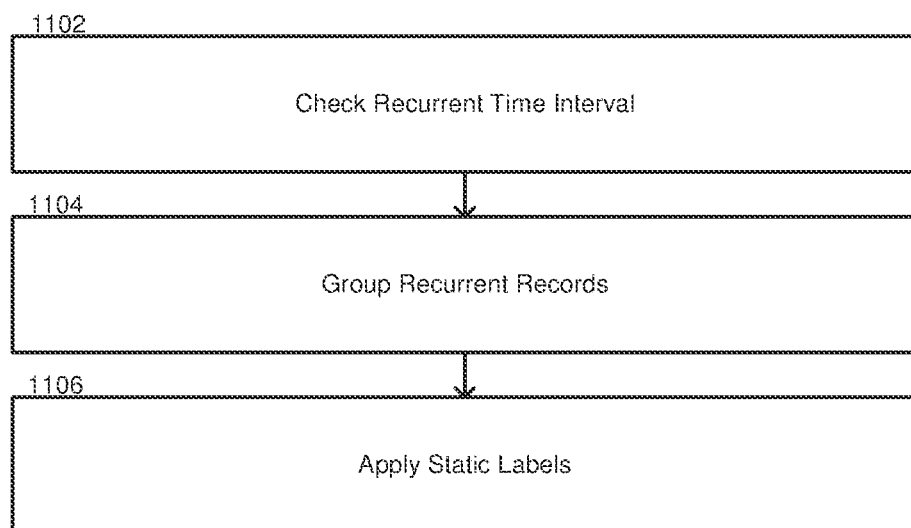
FIG. 11 is a flow diagram representing example operations of network equipment to perform a static recurrent pattern identification process, in accordance with various aspects and embodiments of the subject disclosure.

FIG. 11 is a flow diagram representing example operations of network equipment to perform a static recurrent pattern identification process, in accordance with various aspects and embodiments of the subject disclosure. FIG. 11 can be understood by reference to FIG. 10, and can be performed for example by network equipment 800 illustrated in FIG. 8. At check recurrent time interval 1102, for a UE observed (cell, TA), network equipment 800 can check a recurrent time interval, defined as the time difference between a next time minus a current time of observing a same (cell, TA). If the recurrent time interval is less than or equal to a predetermined value, e.g. a recurrent_session_cut-off value such as 10 minutes, then network equipment 800 can consider the UE to be in a same recurrent period and can assign a recurrent period identifier recurrent_period_id.

At group recurrent records 1104, network equipment 800 can be configured to group by (recurrent_period_id, cell, TA), and compute a max_time of max(timestamp), a min_time of min(timestamp), and a corresponding period duration, defined as recurrent_duration=max_time−min_time. If recurrent_duration is greater than or equal to a predetermined recurrent time cutoff value such as 4 minutes, network equipment 800 can mark the whole recurrent period (recurrent_period_id, min_time, max_time) as a 'static' recurrent period.

At apply static labels 1106, network equipment 800 can be configured to check if, for any UE records, the timestamp is within any static recurrent period (recurrent_period_id, min_time, max_time). If yes, network equipment 800 can mark the timestamp as 'static'.

Figure 12:
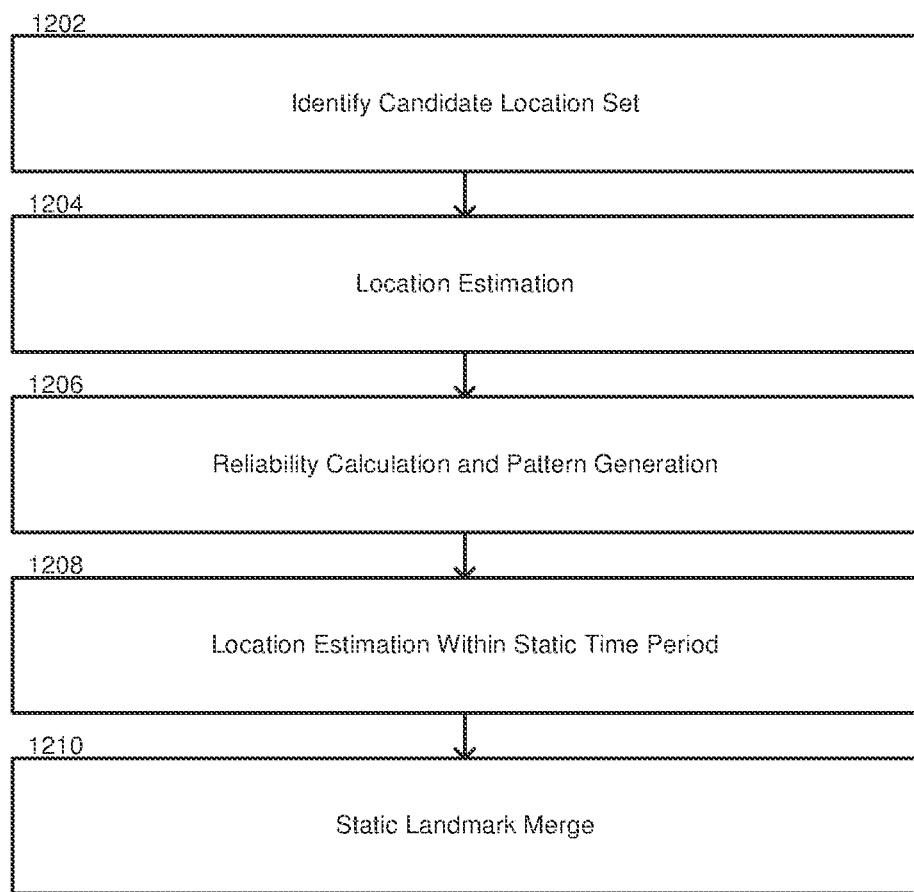
FIG. 12 is a flow diagram representing example operations of network equipment to perform a static geolocation process, in accordance with various aspects and embodiments of the subject disclosure.

FIG. 12 is a flow diagram representing example operations of network equipment to perform a static geolocation process, in accordance with various aspects and embodiments of the subject disclosure. The illustrated operations can be performed, e.g., by network equipment 800 such as illustrated in FIG. 8.

At identify candidate location set 1202, network equipment 800 can determine a candidate location set. For each geolocation estimate in the geotagged time series of call trace records from a given static period, geotagging accuracy filter 802 can identify the geotagging method. Example geotagging methods may include, but are not limited to, fingerprinting, FVP geotagging, and handover arc intersection calculation.

If the accuracy of a geotagging method identified by geotagging accuracy filter 802 is within an acceptable range (e.g. median of 100 meters or less, 75% 200 meters or less), then geotagging accuracy filter 802 can add the estimated location to the location estimates candidate set 803. If no geolocation method has accuracy within the acceptable range, then geotagging accuracy filter 802 can pick a location with a best relative accuracy and add it to the location estimates candidate set 803. Optionally, geotagging accuracy filter 802 can confirm that estimated static locations are within a reasonable range of moving UE locations occurring immediately before and after a current static time period, considering the speed of motion required to traverse the distance between those locations.

At location estimation 1204, network equipment 800 can perform location estimation. If the candidate set 803 has a single element, then network equipment 800 can use it as the location estimate for up to every record within a static period. If there are multiple points in the candidate set 803, then network equipment 800 can use a suitable interpolation technique (e.g., linear, spline regression, median calculation) to derive a location estimate for the records in a static period.

At reliability calculation and pattern generation 1206, reliability calculation 804 can process the candidate set 803. For each location in the candidate set 803 and each record in the static period time series, reliability calculation 804 can compute: (1) a distance difference defined as |UE to cell distance/78−TA|; and (2) an azimuth gap defined as |Cell to UE azimuth−Cell azimuth|. Furthermore, for each location in the candidate set 803, reliability calculation 804 can count the number of records where the distance difference is smaller than a distance cutoff (e.g. 2) and the azimuth gap is smaller than an azimuth cutoff (e.g. 90).

If the resulting count is high (e.g. three or more), then reliability calculation 804 can mark a location along with the corresponding network measurement (IMSI, serving cell, TA, est_lat, est_lon) as highly reliable. Furthermore, if a reliable location is newly observed, reliability calculation 804 can add it to the static patterns data store 806. The static pattern data store 806 can include patterns learned using multiple different methods, and can also include FVP static pattern 807. The static pattern data store 806 can enable mobility mode identification 304 as well as UE geolocation estimation when a relevant pattern is observed within a static time period.

At location estimation within static time period 1208, network equipment 800 can perform location estimation within a static time period, in order to generate geotagged static output 805. Network equipment 800 can pick a location estimate ranked first with highest count, optionally breaking ties using the average of distance difference and azimuth gap. Network equipment 800 can apply the selected location estimate for: either all records within the static period, or only those records where the corresponding location estimates are not included in the reliable location estimate set.

At static landmark merge 1210, a static landmark merge process can merge some static periods and re-run operations, starting with geotagging accuracy filter 802, for changed static periods. In an example static landmark merge process, first, if any two consecutive static periods with estimated locations within a predetermined distance_cutoff value, such as 50 meters, and the time gap between the two periods is within a predetermined merge_cutoff value, such as 10 minutes, then the moving period between these two static sessions can be changed to be static. Second, the static landmark merge process can merge the three periods into a single static period. The first and second operations can be applied to all periods and merges can be performed if necessary. Afterwards, the static location process can optionally be re-run.

Figure 13:
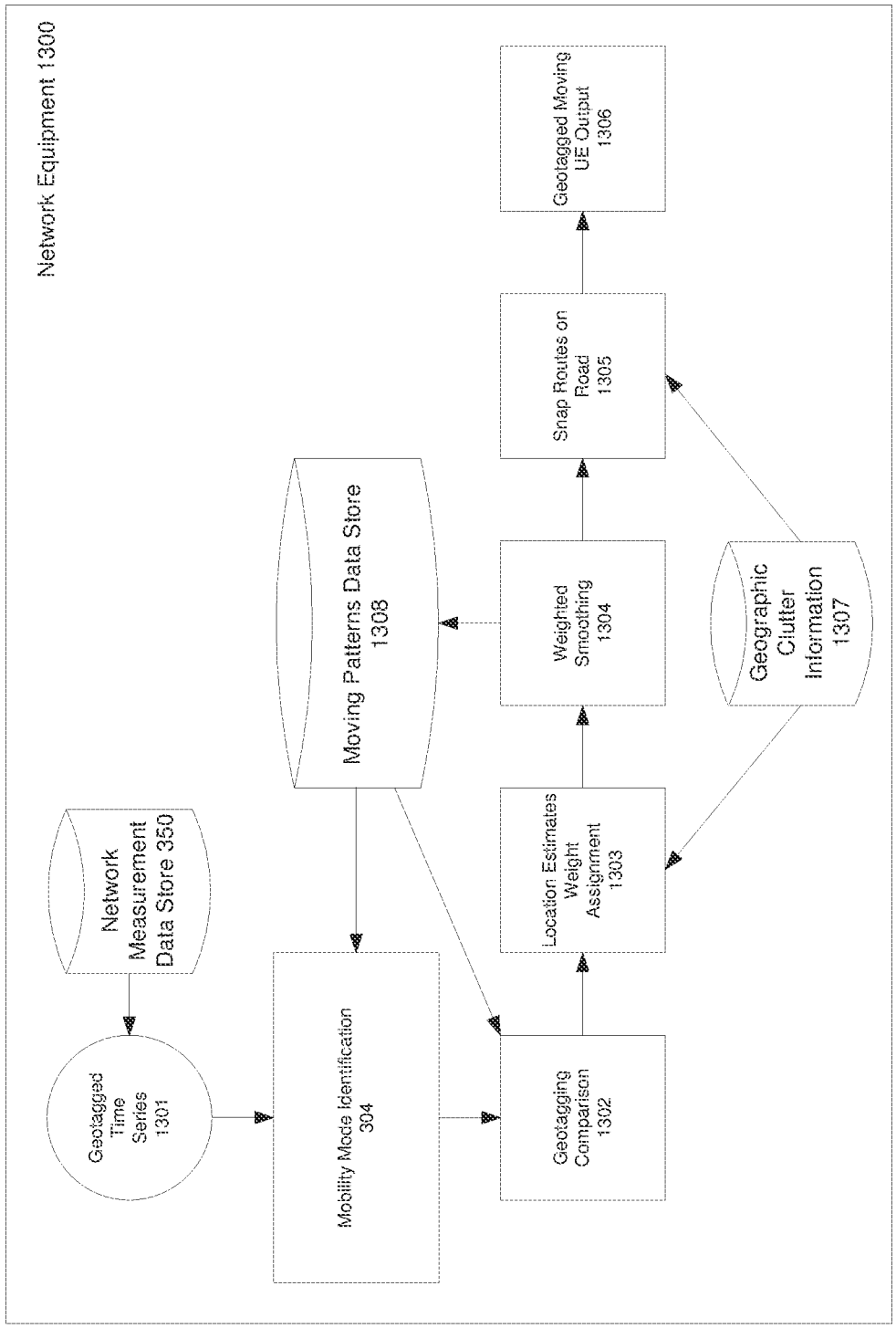
FIG. 13 illustrates example network equipment configured to estimate moving user equipment locations based on network measurement data, in accordance with various aspects and embodiments of the subject disclosure.

FIG. 13 illustrates example network equipment configured to estimate moving user equipment locations based on network measurement data, in accordance with various aspects and embodiments of the subject disclosure. FIG. 13 includes example network equipment 1300, wherein the example network equipment 1300 can optionally process network measurement data associated with moving user equipment locations. As such, aspects of network equipment 1300 can optionally be included in the network equipment 300 described with reference to FIG. 3, and vice versa. For example, in some embodiments, network equipment 1300 can implement the moving smoothing 307 illustrated in FIG. 3.

The network equipment 1300 includes network measurement data store 350, geotagged time series 1301, mobility mode identification 304, geotagging comparison 1302, location estimates weight assignment 1303, weighted smoothing 1304, snap routes on road 1305, geotagged moving UE output 1306, moving patterns data store 1308, and geographic clutter information 1307.

In general, with reference to FIG. 13, the network equipment 1300 can be configured to implement a framework for moving UE identification and route estimation with the measurements reported by cells and eNodeBs in the telecommunications network. Methods can utilize both the network measurement patterns and time-sequences of UE locations estimated by general online geotagging technologies. In a first step, mobility mode identification 304 can be used to determine a time period where the UE is in motion. Subsequently, a moving location refinement process can be applied to the geolocation estimates from such moving time periods. The moving location refinement process can remove outliers and smooth the overall route. This process can consider the geotagging method/accuracy of individual location estimates as well as further information, including geographic clutter (for example, road type) and speed of travel.

In one proposed approach, embodiments according to FIG. 13 can include a framework to identify moving UEs and estimate their routes in a telecommunication network. Embodiments can extract time periods where the UE is in motion, from the time series of network measurements, via a UE "mobility mode" identification process. Embodiments can furthermore apply a smoothing processing to remove outliers and estimate a robust route based on geographic clutter (road types) information. A "moving pattern" label can be applied to network measurement/estimated location pairs. This data can then be fed back to the UE mobility mode identification process and smoothing processing to refine the patterns over time, enabling process speed up over time.

Figure 14:
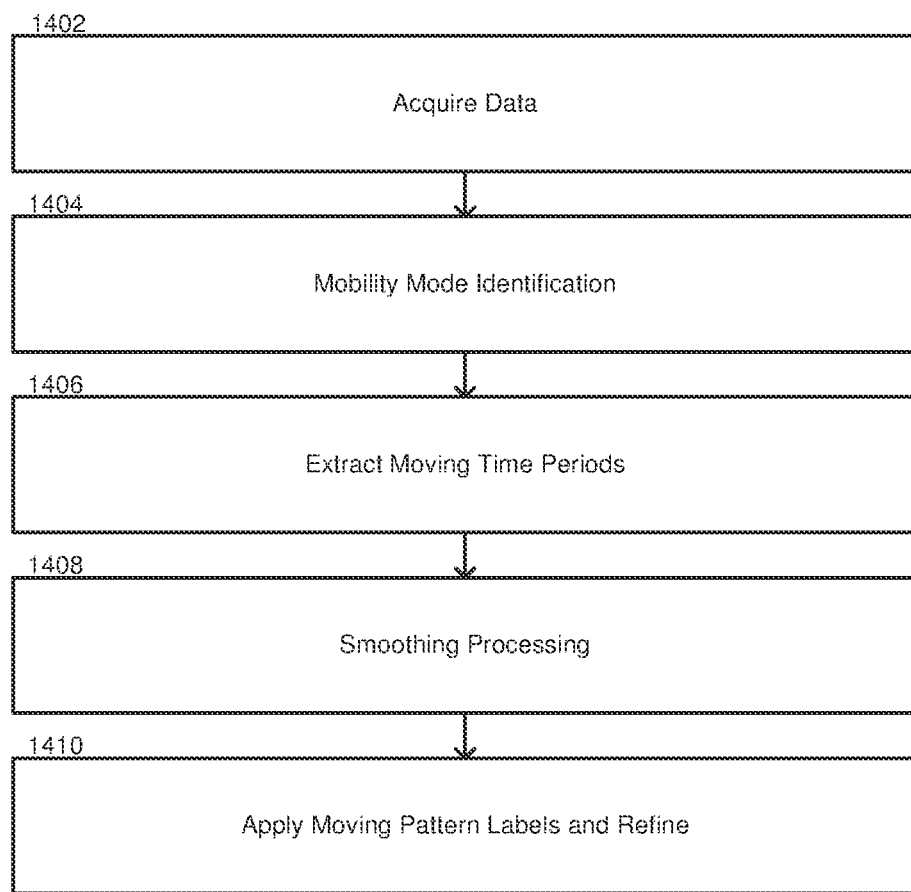
FIG. 14 is a flow diagram representing example operations of network equipment to estimate moving user equipment locations based on network measurement data, in accordance with various aspects and embodiments of the subject disclosure.

FIG. 14 is a flow diagram representing example operations of network equipment to estimate moving user equipment locations based on network measurement data, in accordance with various aspects and embodiments of the subject disclosure. The illustrated operations can be performed, e.g., by network equipment 1300 such as illustrated in FIG. 13.

At acquire data 1402, network equipment 1300 can acquire time-sequences of historical geotagged call trace data, such as geotagged time series 1301. Geotagged time series 1301 can include, but is not limited to, IMSI, timestamp, timing advance, signal strength, serving cell, estimated latitude, estimated longitude, and geotagging type information. The geotagging type information can include, e.g., identifications of geotagging methodologies used for geotagging, and associated accuracy information.

At mobility mode identification 1404, network equipment 1300 can be configured to apply mobility mode identification 304 to the network measurements acquired at 1402, to mark each record UE's status as static or moving. Based on the status, mobility mode identification 304 can form UE moving periods.

At extract moving time periods 1406, network equipment 1300 can be configured to extract the time periods where the UE is in motion. For each record within such periods, location estimates weight assignment 1303 can calculate weights based on the estimation accuracy of the geotagging method and the clutter type associated with the estimated location and the implied UE speed.

At smoothing processing 1408, weighted smoothing 1304 can apply a robust smoothing process wherein the weights calculated operation 1406 can be applied to individual records. The resulting route can be snapped to roads, if applicable.

At apply moving pattern labels and refine 1410, network equipment 1300 can apply a "moving pattern" label to each network measurement/estimated location pair. Network equipment 1300 can feed this data back to the UE mobility mode identification 304 and moving UE route smoothing processing 1304 to refine the patterns over time, enabling process speed up.

The network equipment 1300 can include mobility mode identification 304, introduced in FIG. 3. Example operations of mobility mode identification 304 are previously described with reference FIG. 6.

Figure 15:
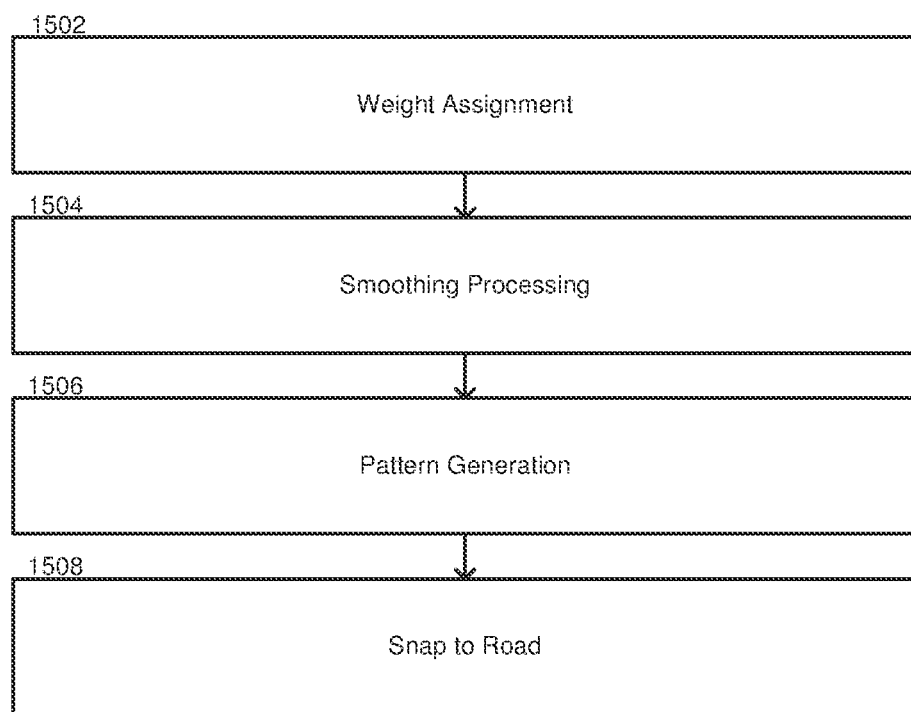
FIG. 15 is a flow diagram representing example operations of network equipment to perform moving smoothing adjustments of estimated locations, in accordance with various aspects and embodiments of the subject disclosure

FIG. 15 is a flow diagram representing example operations of network equipment to perform moving smoothing adjustments of estimated locations, in accordance with various aspects and embodiments of the subject disclosure. The illustrated operations can be performed, e.g., by network equipment 1300 such as illustrated in FIG. 13.

At weight assignment 1502, geotagging comparison 1302 and location estimates weight assignment 1303 can assign weights to location estimates. Operations associated with weight assignment 1502 can include assessing geotagging method accuracy, clutter matching, and optionally, confirmation of starting and ending locations.

In order to assess geotagging method accuracy, for each geolocation estimate in the time series of geotagged call trace records from a given moving period, geotagging comparison 1302 can identify the geotagging technique. Examples of geotagging techniques include, but are not limited to, fingerprinting, FVP geotagging, and handover arc intersection calculation. Geotagging comparison 1302 can form a set of candidate locations, comprising estimates located by geotagging techniques with accuracy within an acceptable range, e.g. with median less than or equal to 500 meters. Location estimates weight assignment 1303 can assign weights to each location estimate based on the geotagging technique accuracy.

In order to perform clutter matching, location estimates weight assignment 1303 can estimate the UE speed based on prior location estimates. For example, the speed can be estimated as the distance between consecutive geolocation estimates divided by the interval between the corresponding timestamps. Location estimates weight assignment 1303 can then compare the estimated speed with a clutter type associated with the location estimate. The clutter type can be retrieved from geographic clutter information 1307. Location estimates weight assignment 1303 can assign higher weights to those location estimates where the clutter type is in alignment with the speed level—for example, "primary road" clutter type and speed estimate in excess of 50 mph. If there is a match discrepancy, then location estimates weight assignment 1303 can assign lower weights to those location estimates.

In order to confirm starting and ending locations, location estimates weight assignment 1303 can confirm that the estimated starting and ending locations are within a reasonable range of static UE locations immediately before and after a current moving time period. Embodiments can utilize, for example the speed of motion required to traverse the distance between those locations.

At smoothing processing 1504, weighted smoothing 1304 can divide a time period where a UE is in motion into multiple segments so that each segment corresponds to a limited set of serving cells (e.g. no more than 10) and/or a similar speed level of the UE based on the time interval between points.

Within each segment, weighted smoothing 1304 can perform weighted smoothing processing (for example, spline regression) to smooth the location estimates. Optionally, weighted smoothing 1304 can include static locations before and after a moving period as reference points.

Furthermore, within each segment, weighted smoothing 1304 can apply a robust method such as bootstrapping to remove the impact of outliers on the smoothing. For example, weighted smoothing 1304 can randomly select a subset of location estimates and repeat, starting from division into segments. Weighted smoothing 1304 can identify outliers, e.g., original estimated locations that are far away from smoothened locations. Weighted smoothing 1304 can remove these outliers and redo weighted smoothing processing on the remaining points. Weighted smoothing 1304 can apply the smoothing model to the timestamp of outliers to estimate UE locations.

Furthermore, within each segment, weighted smoothing 1304 can include the location estimates right before and after the segment to form a reasonable continuous route.

After processing the segments, weighted smoothing 1304 can concatenate the smoothed location estimates from multiple segments, for example, weighted smoothing 1304 can concatenate the smoothed location estimates from up to all segments. After the concatenation, weighted smoothing 1304 can evaluate smoothened estimated location distances from original estimated locations. If the distance is small, e.g., smaller than a predetermined distance, weighted smoothing 1304 can mark the smoothened location as a reliable estimated point. If the distance is large, e.g., larger than the predetermined distance, weighted smoothing 1304 can use interpolation of nearby reliable smoothened points as the final smoothed estimation.

At pattern generation 1506, network equipment 1300 can store patterns in moving patterns data store 1308. Each record denoted by (IMSI, serving cell, TA, est_lat, est_lon) can form a pattern. Network equipment 1300 can maintain a tally of the number of times each pattern is observed. If the number of observations of a given pattern exceeds a certain threshold (N), then (if it doesn't already exist in the data store) network equipment 1300 can add it to the moving patterns data store 1308.

At snap to road 1508, snap routes on road 1305 can optionally snap smoothed location estimates to road topology. Based on the smoothed estimated locations, snap routes on road 1305 can recalculate the UE speed. Using the geographical clutter information 1307, snap routes on road 1305 can identify a closest road segment corresponding to each estimated location, which matches the UE speed level. Snap routes on road 1305 can then adjust locations to snap the estimated locations onto the roads. If any sub-segment of the resulting route is deemed implausible, then network equipment 1300 can rerun the weighted smoothing 1304 on that sub-segment. Snap routes on road 1305 can repeat its operations until the route segment aligns with the geographical clutter data. Results of the operations according to FIG. 15 can comprise geotagged moving UE output 1306.

Figure 16:
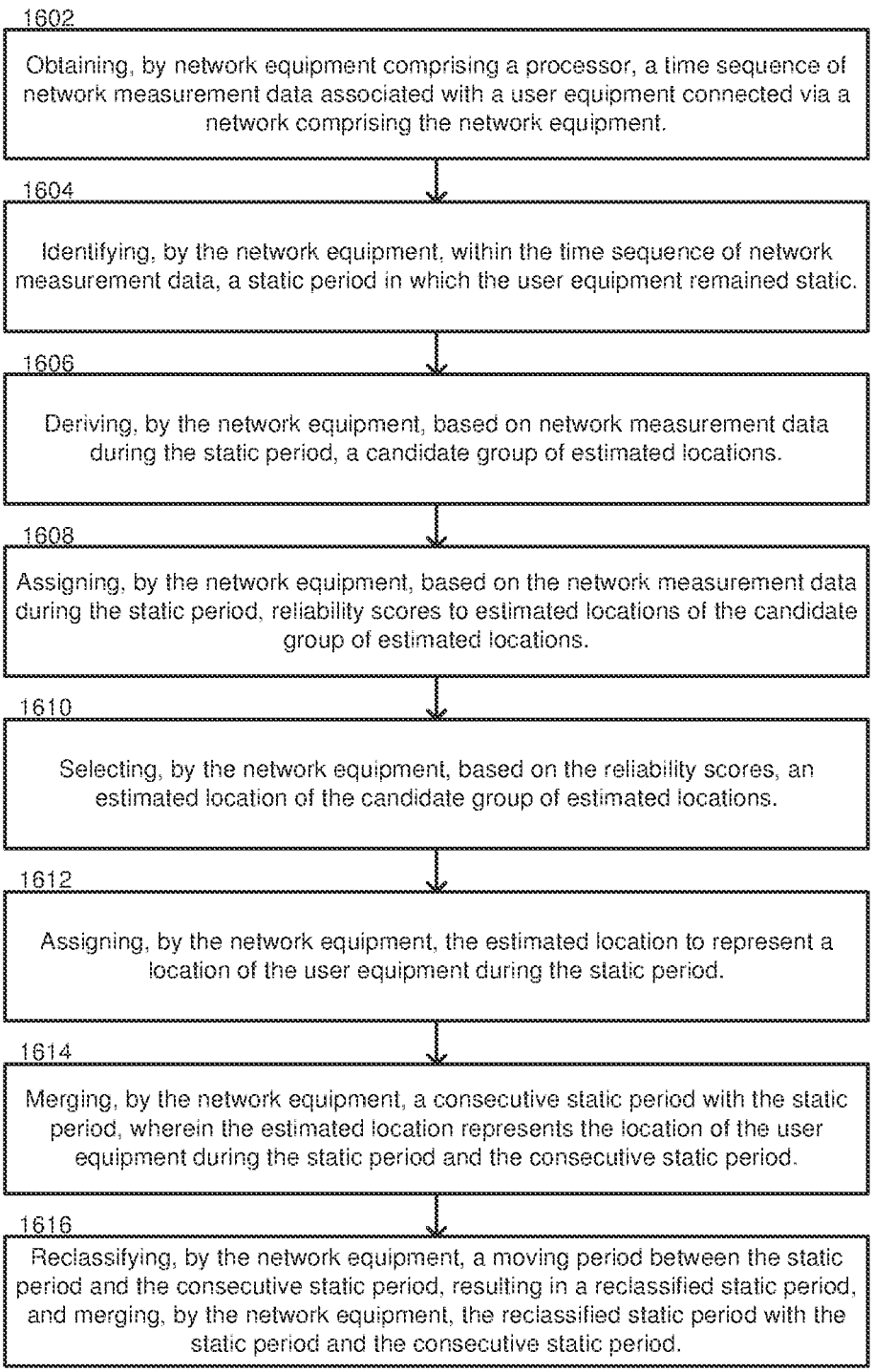
FIG. 16 is a flow diagram representing example operations of network equipment to assign a static location as an estimated user equipment location during a static period, in accordance with various aspects and embodiments of the subject disclosure.

FIG. 16 is a flow diagram representing example operations of network equipment to assign a static location as an estimated user equipment location during a static period, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 16 can be performed, for example, by network equipment 800 such as illustrated in FIG. 8. Example operation 1602 comprises obtaining, by network equipment 800 comprising a processor, a time sequence of network measurement data, e.g., geotagged time series 802, associated with a user equipment connected via a network comprising the network equipment. The user equipment can comprise a user equipment 102 which visits, for example, the locations illustrated in FIG. 2. The time sequence of network measurement data can comprise historical geotagged call trace data comprising at least one of international mobile subscriber identity information, timestamp information, timing advance information, signal strength information, serving cell information, estimated latitude information, estimated longitude information, or geotagging type information.

Example operation 1604 comprises identifying, by the network equipment 800, within the time sequence of network measurement data 801, a static period in which the user equipment remained static. Any of a number of approaches disclosed herein can be used to identify the static period. For example, identifying the static period can comprise identifying a recurring pattern of network measurement data within the time sequence of network measurement data. The recurring pattern of network measurement data can comprise network measurement data that repeats within a predetermined time interval. For example, repeating cell and TA information within an interval such as 10 or 15 minutes can indicate a static UE.

Example operation 1606 comprises deriving, by the network equipment 800, based on network measurement data during the static period, a candidate group of estimated locations. Deriving the candidate group of estimated locations can comprise, e.g., selecting network measurement data comprising estimated location information, based on geotagging type information associated with the network measurement data during the static period. Estimated location information which was generated by more accurate geotagging types can be selected for inclusion in the candidate group of estimated locations.

Example operation 1608 comprises assigning, by the network equipment 800, based on the network measurement data during the static period, reliability scores to estimated locations of the candidate group of estimated locations. In some embodiments, assigning the reliability scores to estimated locations can comprise comparing first distance information derived from the network measurement data during the static period with second distance information derived from the network measurement data during the static period. For example, the first distance information can comprise a UE to cell distance based on geotagging location information included in the network measurement data, and the second distance information can comprise a UE to cell distance timing advance information included in the network measurement data. More accurate/reliable geotagging location information will generally have a smaller difference from the distance calculated using timing advance information, and so smaller differences can be associated with higher reliability scores, and vice versa.

In some embodiments, assigning the reliability scores to estimated locations of the candidate group of estimated locations can comprise comparing first azimuth information derived from the network measurement data during the static period with second azimuth information derived from the network measurement data during the static period. Again, azimuth based on geotagging location information can be compared with reported azimuth information, and higher reliability scores can be applied when the differences are smaller, and vice versa.

Example operation 1610 comprises selecting, by the network equipment 800, based on the reliability scores, an estimated location of the candidate group of estimated locations, and example operation 1612 comprises assigning, by the network equipment 800, the estimated location to represent a location of the user equipment during the static period.

Example operation 1614 comprises merging, by the network equipment 800, a consecutive static period with the static period, wherein the estimated location represents the location of the user equipment during the static period and the consecutive static period. For example, when location information is similar across two consecutive static periods, the most reliable estimated location from one of the static periods, as determined by operations 1602-1612, can be applied to both consecutive periods.

Example operation 1616 comprises reclassifying, by the network equipment 800, a moving period between the static period and the consecutive static period, resulting in a reclassified static period, and merging, by the network equipment 800, the reclassified static period with the static period and the consecutive static period. For example, a short duration moving period between two consecutive static periods may be due to incorrect/noisy network data. Therefore, the moving period can be reclassified as a static period, the location applied to the surrounding static periods can be assigned, and all three periods can be merged as a single static period.

Figure 17:
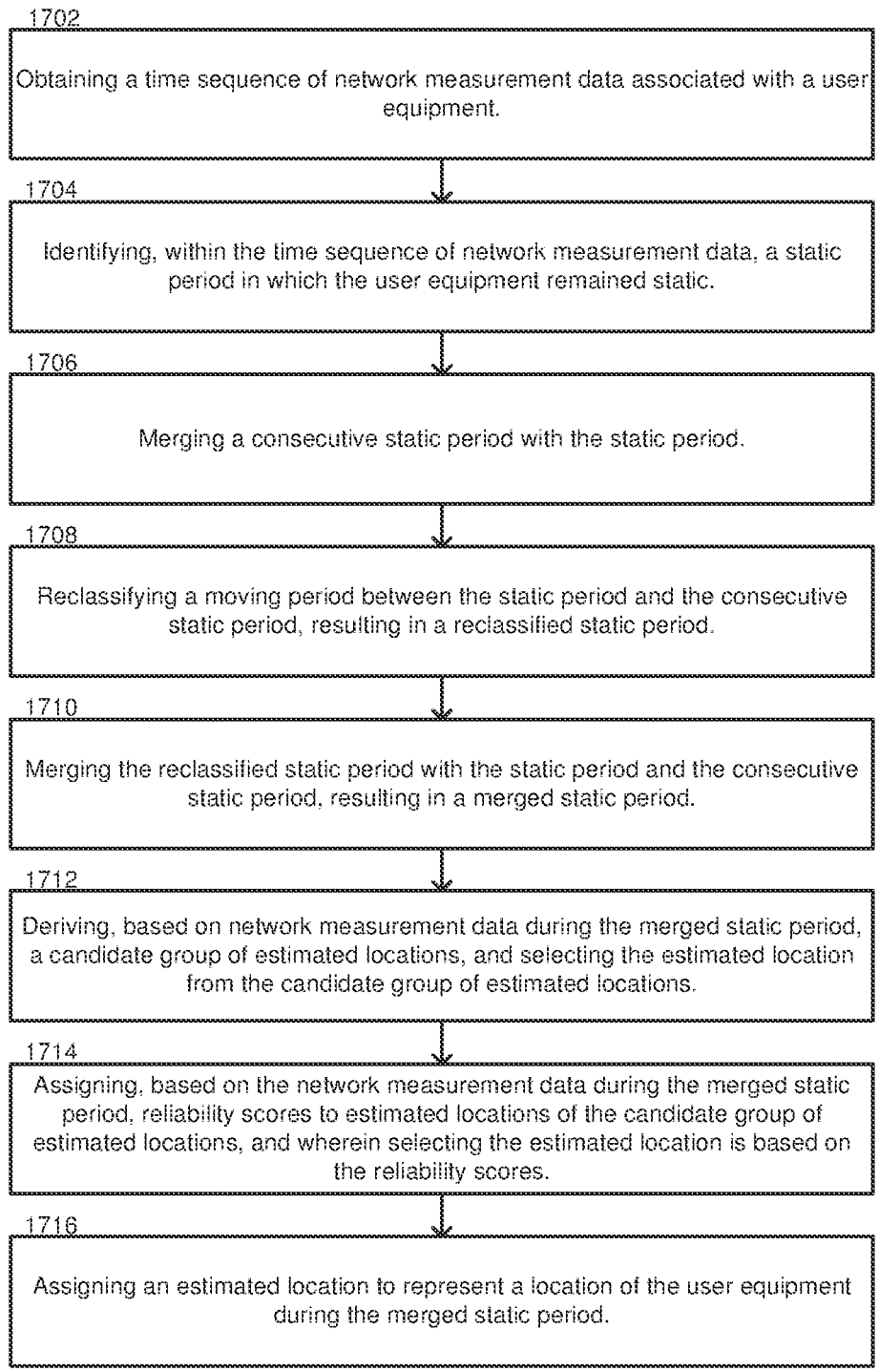
FIG. 17 is a flow diagram representing example operations of network equipment to reclassify a user equipment moving period as a static, static period, and assigning a static location to the reclassified period, in accordance with various aspects and embodiments of the subject disclosure.

FIG. 17 is a flow diagram representing example operations of network equipment to reclassify a user equipment moving period as a static, non-moving period, and assigning a static location to the reclassified period, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 17 can be performed, for example, by network equipment 800 such as illustrated in FIG. 8. Example operation 1702 comprises obtaining a time sequence of network measurement data associated with a user equipment, such as geotagged time series 801. Example operation 1704 comprises identifying, within the time sequence of network measurement data 801, a static period in which the user equipment remained static. For example, mobility mode identification 304 can identify static periods as described herein. In some embodiments, identifying the static period can comprise identifying a recurring pattern of network measurement data within the time sequence of network measurement data, for example, as described in connection with FIG. 10 and FIG. 11. The recurring pattern of network measurement data can comprise network measurement data that repeats within a predetermined time interval.

Example operation 1706 comprises merging a consecutive static period with the static period. The consecutive static period can optionally be separated from the static period by other periods of different types, e.g., by moving periods. Example operation 1708 comprises reclassifying a moving period between the static period and the consecutive static period, resulting in a reclassified static period. The reclassified static period is the period that was formerly classified as a moving period.

Example operation 1710 comprises merging the reclassified static period with the static period and the consecutive static period, resulting in a merged static period. A best location estimate can then be applied to the merged static period, pursuant to operations 1712-1716.

Example operation 1712 comprises deriving, based on network measurement data during the merged static period, a candidate group of estimated locations, and selecting the estimated location from the candidate group of estimated locations. Operation 1714 can enable the selection. Example operation 1714 comprises assigning, based on the network measurement data during the merged static period, reliability scores to estimated locations of the candidate group of estimated locations. Selecting the estimated location can be based on the reliability scores. For example, assigning the reliability scores can comprise comparing first distance and/or azimuth information derived from the network measurement data during the static period with second distance and/or azimuth information derived from the network measurement data during the static period, as described above with reference to FIG. 16.

Example operation 1716 comprises assigning an estimated location to represent a location of the user equipment during the merged static period. For example, the estimated location selected from among the candidate group of estimated locations can be assigned to represent a location of the user equipment during the merged static period.

Figure 18:
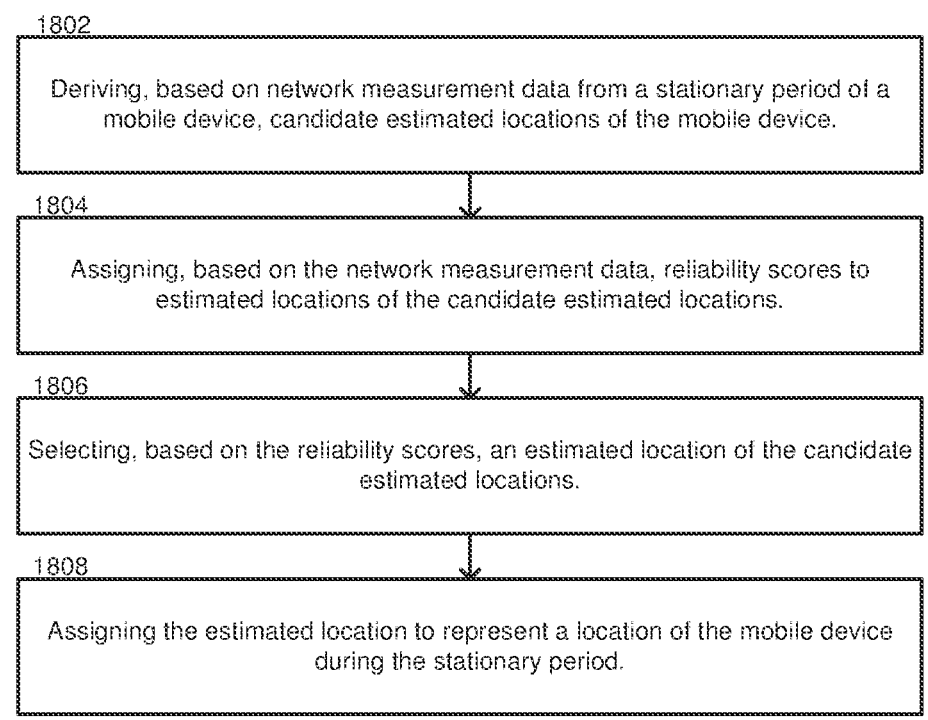
FIG. 18 is a flow diagram representing example operations of network equipment to assign a static location as an estimated user equipment location during a static period based on reliability scores of estimated location information pertaining to the static period, in accordance with various aspects and embodiments of the subject disclosure.

FIG. 18 is a flow diagram representing example operations of network equipment to assign a static location as an estimated user equipment location during a static period based on reliability scores of estimated location information pertaining to the static period, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 18 can be performed, for example, by network equipment 800 such as illustrated in FIG. 8. Example operation 1802 comprises deriving, based on network measurement data from a stationary, i.e., static period of a mobile device, candidate estimated locations of the mobile device. Deriving the candidate estimated locations can comprise, for example, selecting location information from location information included in the network measurement data.

Example operation 1804 comprises assigning, based on the network measurement data, reliability scores to estimated locations of the candidate estimated locations. Assigning the reliability scores to the estimated locations can comprise, e.g. comparing first distance information derived from the network measurement data during the stationary period, e.g., distance from a UE to a cell based on reported geotagging information, with second distance information derived from the network measurement data during the stationary period, e.g., distance from a UE to a cell TA information. A smaller difference between the first distance information and the second distance information corresponds to a higher reliability score, as described herein.

In another aspect, assigning the reliability scores to the estimated locations can comprise comparing first azimuth information derived from the network measurement data during the stationary period, e.g., azimuth based on reported geotagging information, with second azimuth information derived from the network measurement data during the stationary period e.g., azimuth based on reported serving cell information. A smaller difference between the first azimuth information and the second azimuth information corresponds to a higher reliability score, as described herein.

Example operation 1806 comprises selecting, based on the reliability scores, an estimated location of the candidate estimated locations. Example operation 1808 comprises assigning the estimated location to represent a location of the mobile device during the stationary period.

Figure 19:
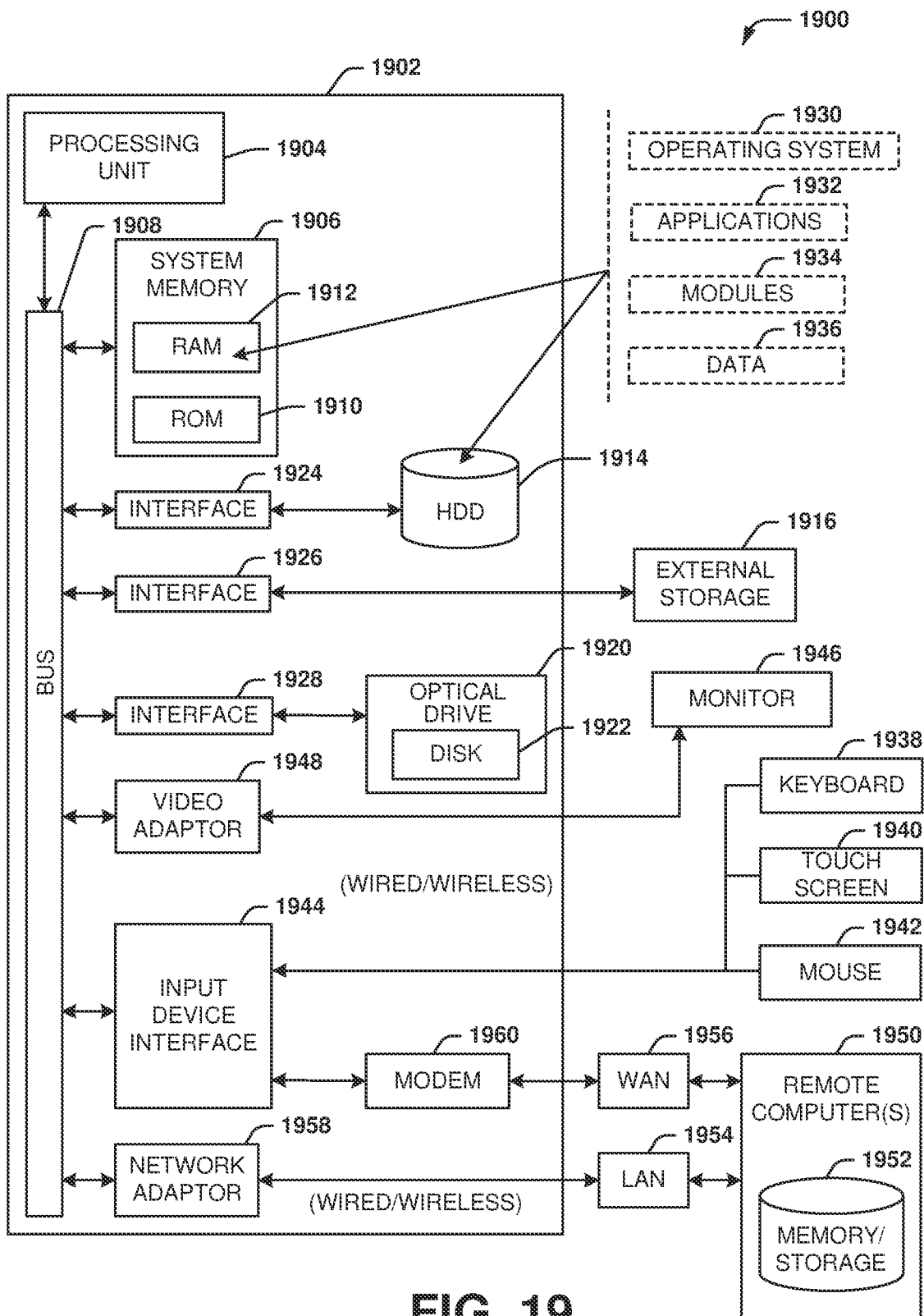
FIG. 19 is a block diagram of an example computer that can be operable to execute processes and methods in accordance with various aspects and embodiments of the subject disclosure.

FIG. 19 is a block diagram of an example computer that can be operable to execute processes and methods in accordance with various aspects and embodiments of the subject disclosure. The example computer can be adapted to implement, for example, any of the various network equipment described herein.

FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and an optical disk drive 1920 (e.g., which can read or write from a CD-ROM disc, a DVD, a BD, etc.). While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and optical disk drive 1920 can be connected to the system bus 1908 by an HDD interface 1924, an external storage interface 1926 and an optical drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enabled with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   obtaining, by network equipment comprising a processor, a time sequence of network measurement data associated with a user equipment connected via a network comprising the network equipment;
   identifying, by the network equipment, within the time sequence of network measurement data, a static period in which the user equipment remained static;
   deriving, by the network equipment, based on network measurement data during the static period, a candidate group of estimated locations;
   assigning, by the network equipment, based on the network measurement data during the static period, reliability scores to estimated locations of the candidate group of estimated locations; and
   selecting, by the network equipment, based on the reliability scores, an estimated location of the candidate group of estimated locations; and
   assigning, by the network equipment, the estimated location to represent a location of the user equipment during the static period.

2. The method of claim 1, wherein the time sequence of network measurement data comprises historical geotagged call trace data comprising at least one of international mobile subscriber identity information, timestamp information, timing advance information, signal strength information, serving cell information, estimated latitude information, estimated longitude information, or geotagging type information.

3. The method of claim 1, wherein deriving the candidate group of estimated locations based on network measurement data during the static period comprises selecting network measurement data comprising estimated location information, based on geotagging type information associated with the network measurement data during the static period.

4. The method of claim 1, further comprising merging, by the network equipment, a consecutive static period with the static period, wherein the estimated location represents the location of the user equipment during the static period and the consecutive static period.

5. The method of claim 4, further comprising reclassifying, by the network equipment, a moving period between the static period and the consecutive static period, resulting in a reclassified static period, and merging, by the network equipment, the reclassified static period with the static period and the consecutive static period.

6. The method of claim 1, wherein identifying the static period comprises identifying a recurring pattern of network measurement data within the time sequence of network measurement data.

7. The method of claim 6, wherein the recurring pattern of network measurement data comprises network measurement data that repeats within a predetermined time interval.

8. The method of claim 1, wherein assigning the reliability scores to estimated locations of the candidate group of estimated locations comprises comparing first distance information derived from the network measurement data during the static period with second distance information derived from the network measurement data during the static period.

9. The method of claim 1, wherein assigning the reliability scores to estimated locations of the candidate group of estimated locations comprises comparing first azimuth information derived from the network measurement data during the static period with second azimuth information derived from the network measurement data during the static period.

10. Network equipment, comprising:
    a processor; and
    a memory that stores executable instructions that, when executed by the processor, facilitate performance of operations, comprising:
       obtaining a time sequence of network measurement data associated with a user equipment;
       identifying, within the time sequence of network measurement data, a static period in which the user equipment remained static;
       merging a consecutive static period with the static period;
       reclassifying a moving period between the static period and the consecutive static period, resulting in a reclassified static period;
       merging the reclassified static period with the static period and the consecutive static period, resulting in a merged static period; and
       assigning an estimated location to represent a location of the user equipment during the merged static period.

11. The network equipment of claim 10, wherein the operations further comprise deriving, based on network measurement data during the merged static period, a candidate group of estimated locations, and selecting the estimated location from the candidate group of estimated locations.

12. The network equipment of claim 11, wherein the operations further comprise assigning, based on the network measurement data during the merged static period, reliability scores to estimated locations of the candidate group of estimated locations, and wherein selecting the estimated location is based on the reliability scores.

13. The network equipment of claim 12, wherein assigning the reliability scores to estimated locations of the candidate group of estimated locations comprises comparing first distance information derived from the network measurement data during the static period with second distance information derived from the network measurement data during the static period.

14. The network equipment of claim 10, wherein identifying the static period comprises identifying a recurring pattern of network measurement data within the time sequence of network measurement data.

15. The network equipment of claim 14, wherein the recurring pattern of network measurement data comprises network measurement data that repeats within a predetermined time interval.

16. A non-transitory machine-readable medium, comprising executable instructions that, when executed by a processor, facilitate performance of operations, comprising:
    deriving, based on network measurement data from a stationary period of a mobile device, candidate estimated locations of the mobile device;
    assigning, based on the network measurement data, reliability scores to estimated locations of the candidate estimated locations,
    wherein assigning the reliability scores to the estimated locations of the candidate estimated locations comprises comparing first distance information derived from the network measurement data during the stationary period with second distance information derived from the network measurement data during the stationary period;
    selecting, based on the reliability scores, an estimated location of the candidate estimated locations; and
    assigning the estimated location to represent a location of the mobile device during the stationary period.

17. The non-transitory machine-readable medium of claim 16, wherein a smaller difference between the first distance information and the second distance information corresponds to a higher reliability score.

18. The non-transitory machine-readable medium of claim 16, wherein assigning the reliability scores to the estimated locations of the candidate estimated locations comprises comparing first azimuth information derived from the network measurement data during the stationary period with second azimuth information derived from the network measurement data during the stationary period.

19. The non-transitory machine-readable medium of claim 18, wherein a smaller difference between the first azimuth information and the second azimuth information corresponds to a higher reliability score.

20. The non-transitory machine-readable medium of claim 16, wherein deriving the candidate estimated locations comprises selecting location information from location information included in the network measurement data.

\* \* \* \* \*